US 7,080,727 B1

(12) United States Patent
Sanderson

(10) Patent No.: US 7,080,727 B1
(45) Date of Patent: Jul. 25, 2006

(54) CLOTHING TRANSPORT AND STORAGE SYSTEM, APPARATUS AND METHOD

(76) Inventor: Terry Sanderson, 17347 W. Skyridge Dr., Mount Vernon, WA (US) 98274

( * ) Notice: Subject to any disclaimer, the term of this patent is extended or adjusted under 35 U.S.C. 154(b) by 0 days.

(21) Appl. No.: 10/999,795

(22) Filed: Nov. 30, 2004

Related U.S. Application Data

(60) Provisional application No. 60/526,682, filed on Dec. 2, 2003.

(51) Int. Cl.
*B65G 17/32* (2006.01)
(52) U.S. Cl. .................... 198/680; 198/682; 198/465.4
(58) Field of Classification Search ................ 198/682, 198/680, 465.4
See application file for complete search history.

(56) References Cited

U.S. PATENT DOCUMENTS

| | | | |
|---|---|---|---|
| 2,425,146 A | 8/1947 | Comis et al. | |
| 4,036,728 A | 7/1977 | Babinsky | |
| 4,079,840 A | 3/1978 | Usner | |
| 4,279,201 A * | 7/1981 | Solomon | 104/100 |
| 4,429,797 A | 2/1984 | Collins | |
| 4,872,568 A | 10/1989 | Lehmann | |
| 4,903,819 A * | 2/1990 | Heinold et al. | 198/465.4 |
| 5,050,833 A | 9/1991 | Usner | |
| 5,067,620 A | 11/1991 | Norrie | |
| 5,107,996 A | 4/1992 | Wittaker | |
| 5,381,885 A * | 1/1995 | Hirao et al. | 198/465.4 |
| 5,501,345 A | 3/1996 | Hilstolsky et al. | |
| 5,566,815 A * | 10/1996 | Dooley | 198/687.1 |
| 5,664,659 A * | 9/1997 | Gaertner | 198/360 |
| 5,697,508 A | 12/1997 | Rifkin et al. | |
| 5,769,949 A * | 6/1998 | Cienkus et al. | 118/621 |
| 5,829,575 A * | 11/1998 | Williams | 198/678.1 |
| 6,554,127 B1 * | 4/2003 | Kroll | 198/465.4 |
| 6,745,891 B1 * | 6/2004 | Walter et al. | 198/465.4 |
| 6,758,325 B1 * | 7/2004 | Greeley | 198/687.1 |
| 6,942,111 B1 * | 9/2005 | Harrell | 211/113 |

* cited by examiner

*Primary Examiner*—Joe Dillon, Jr.
(74) *Attorney, Agent, or Firm*—Robert B. Hughes; Hughes Law Firm, PLLC

(57) ABSTRACT

A system, apparatus and method for the handling, transport and or storage of items of wearing apparel which are hung on hangers. In the system, there is plurality of transport units which travel over a rail system from a first location (e.g. an inbound location) to a second location (e.g. an outbound location). Each transport unit has a carrier section which, in the first operating position of the transfer unit, is generally horizontally aligned, and is suspended from a rail by means of first and second roller support sections at opposite ends of the carrier section. The transport unit has a second operating position where the carrier section is rotated relative to one of the roller support sections to a more vertical orientation where the garment units are closer together in a horizontal direction and more vertically aligned with one another, this being a position in which the garment units can be stored and/or shipped in a more closely packed configuration.

28 Claims, 15 Drawing Sheets

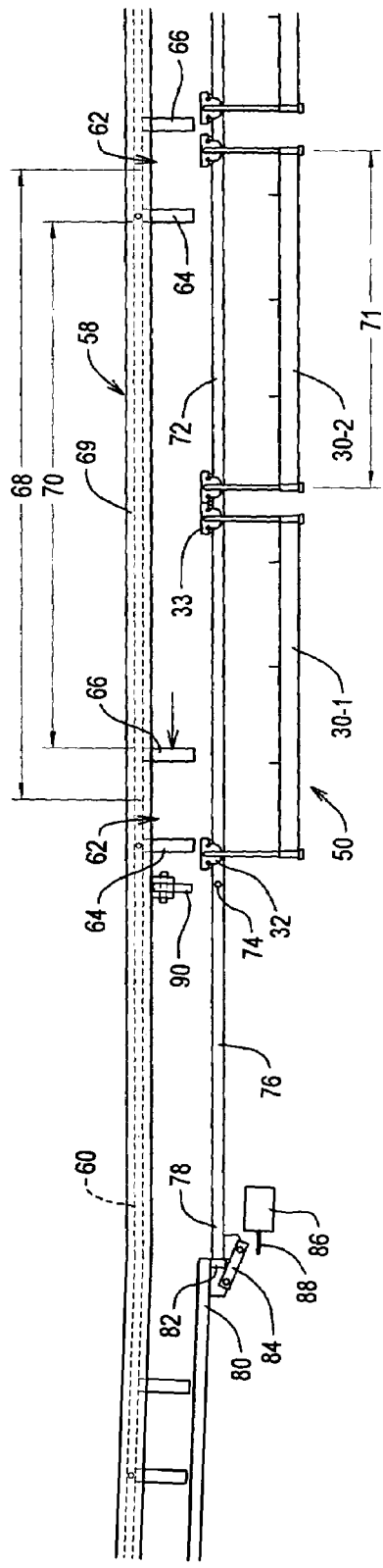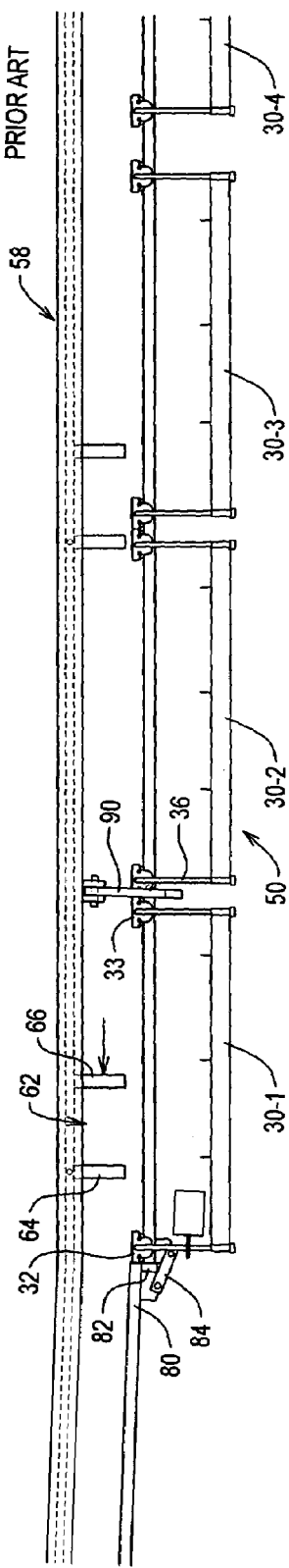

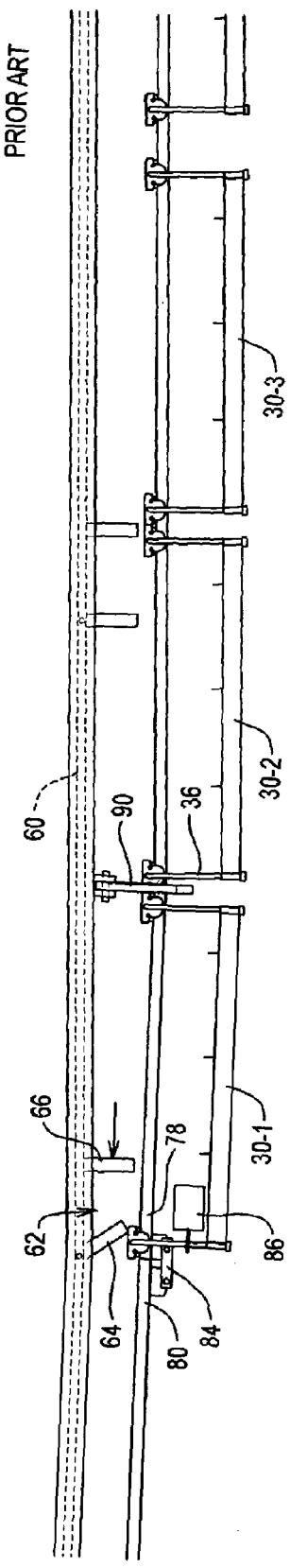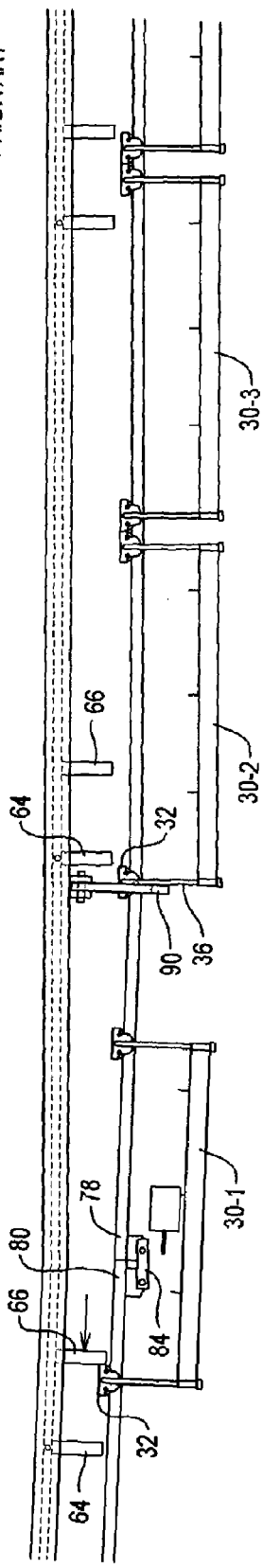

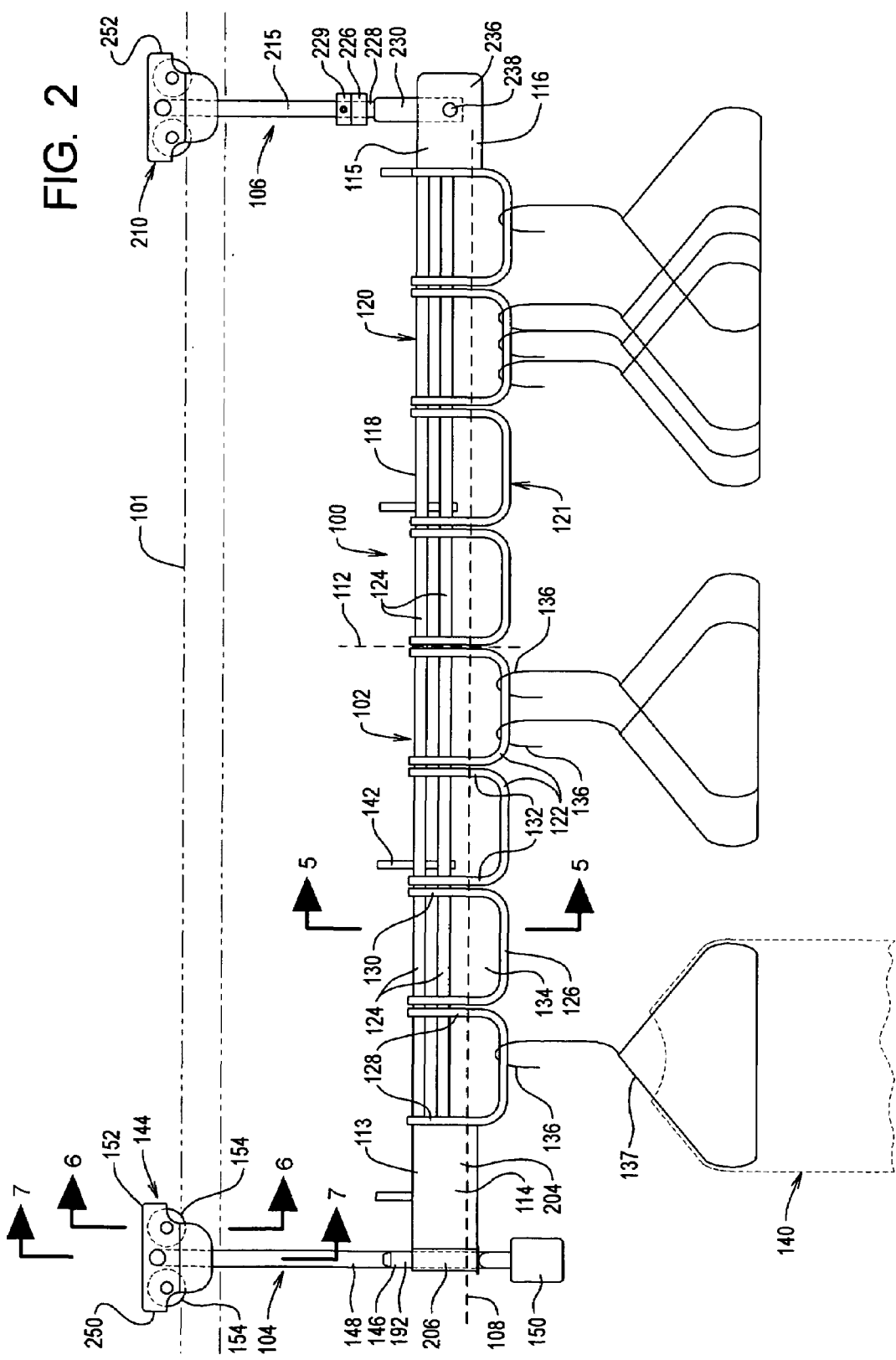

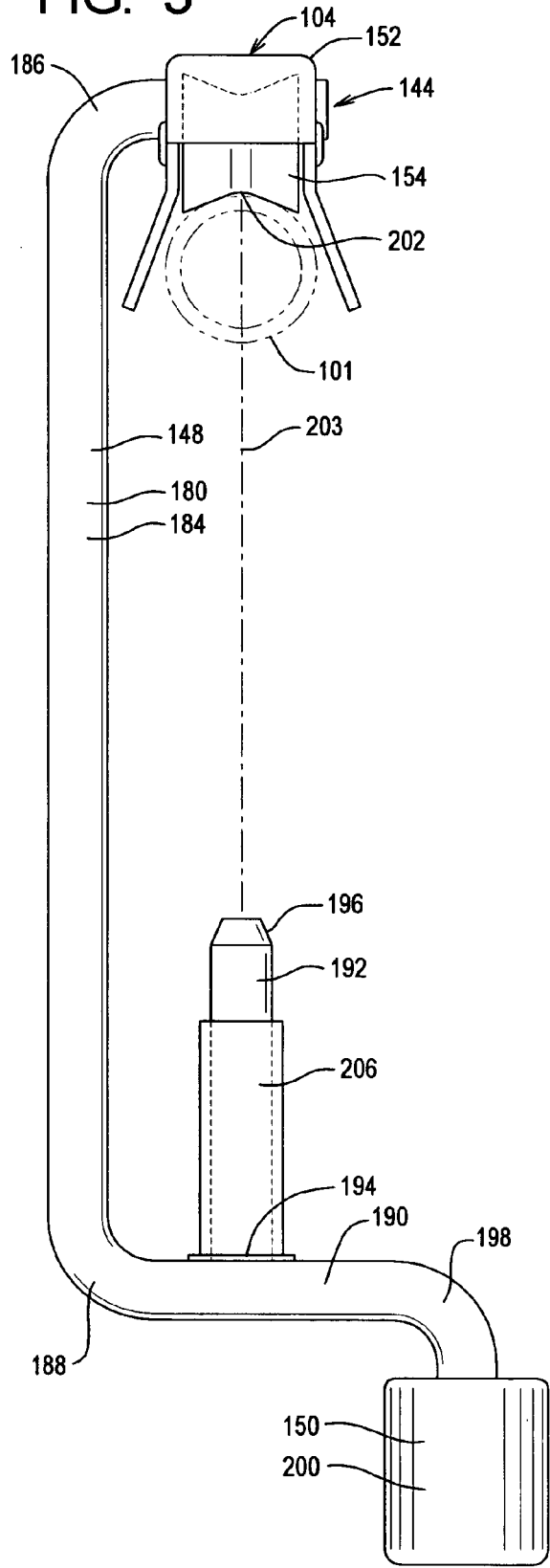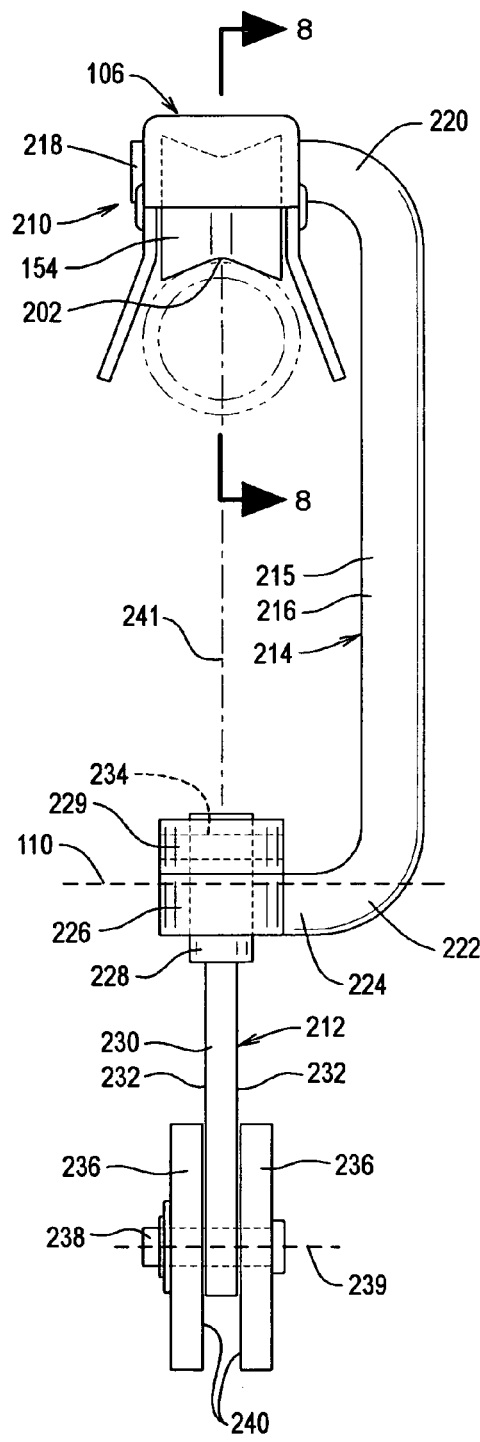

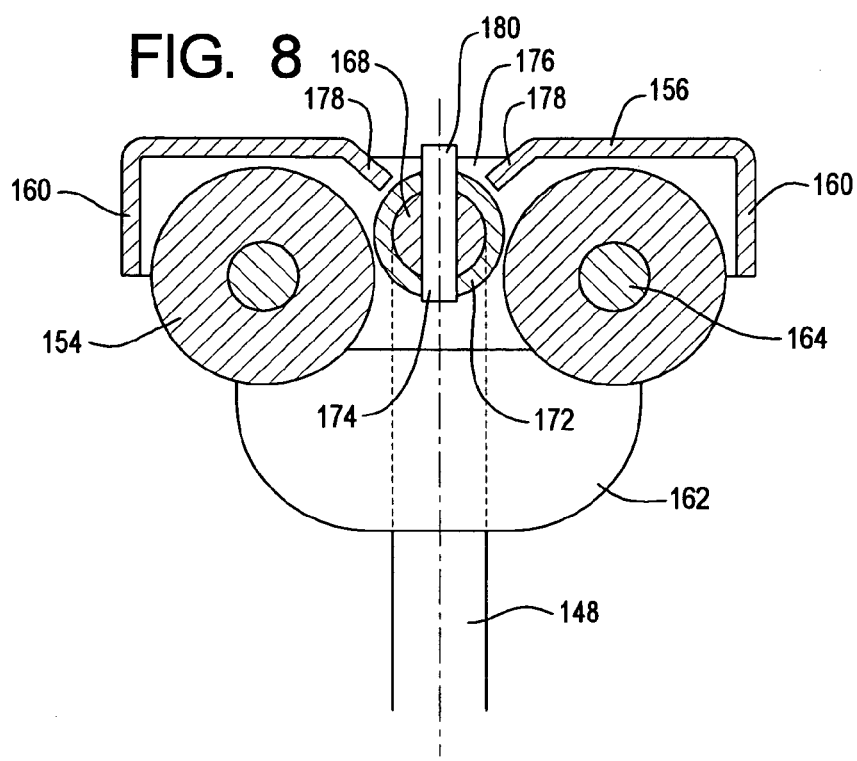
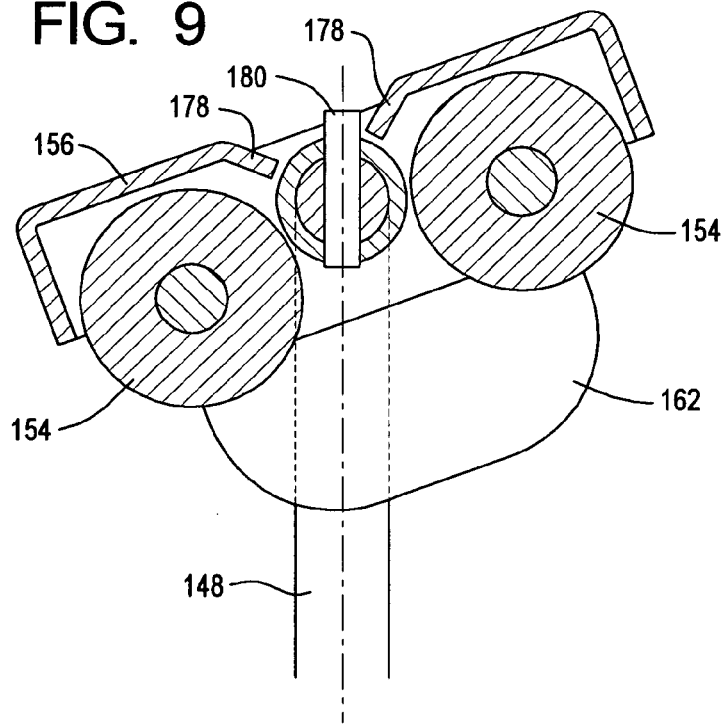

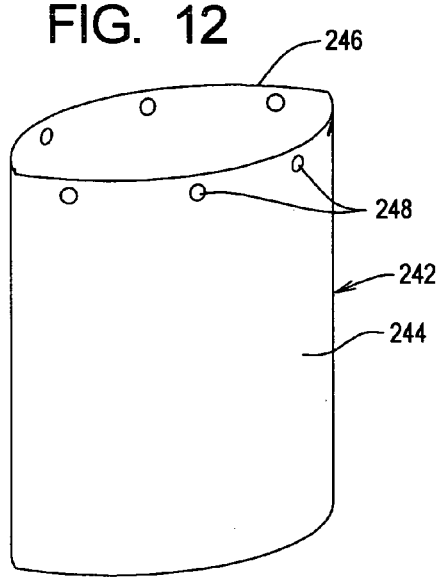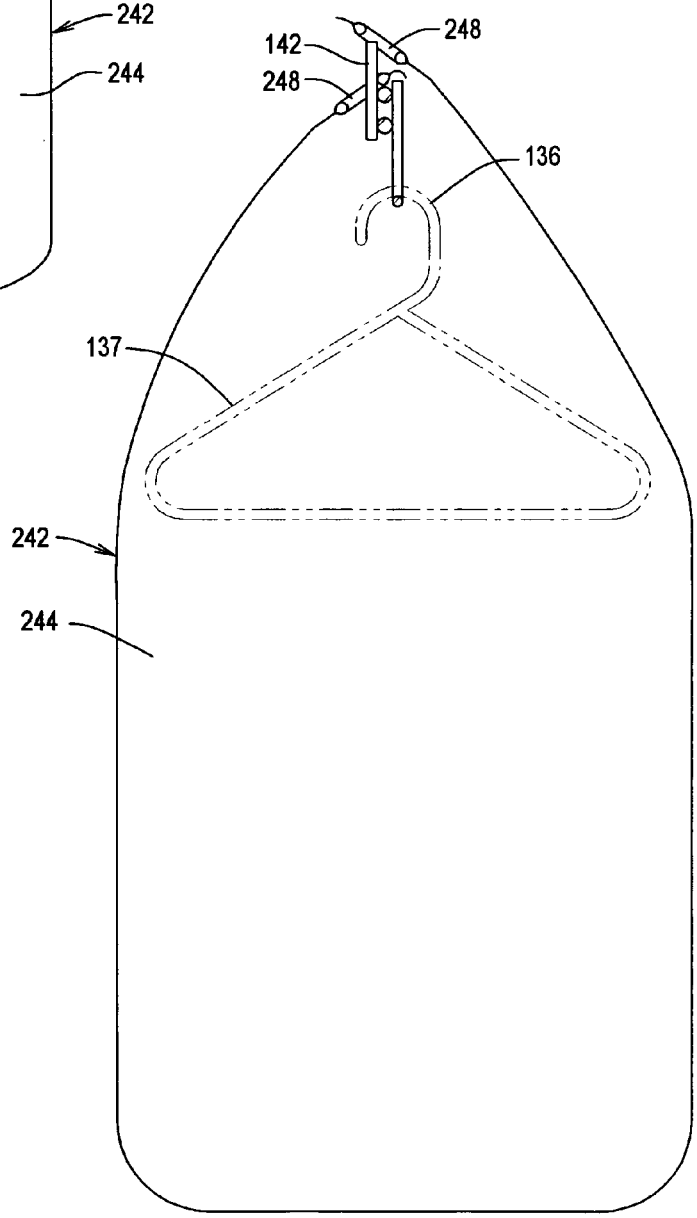

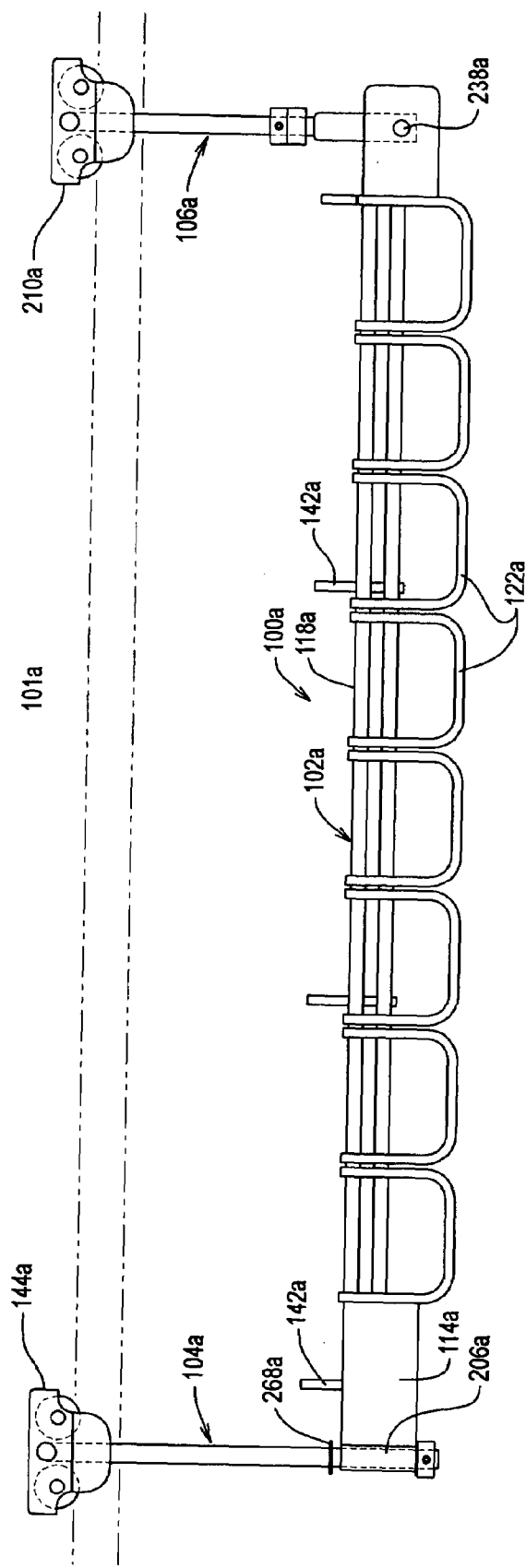

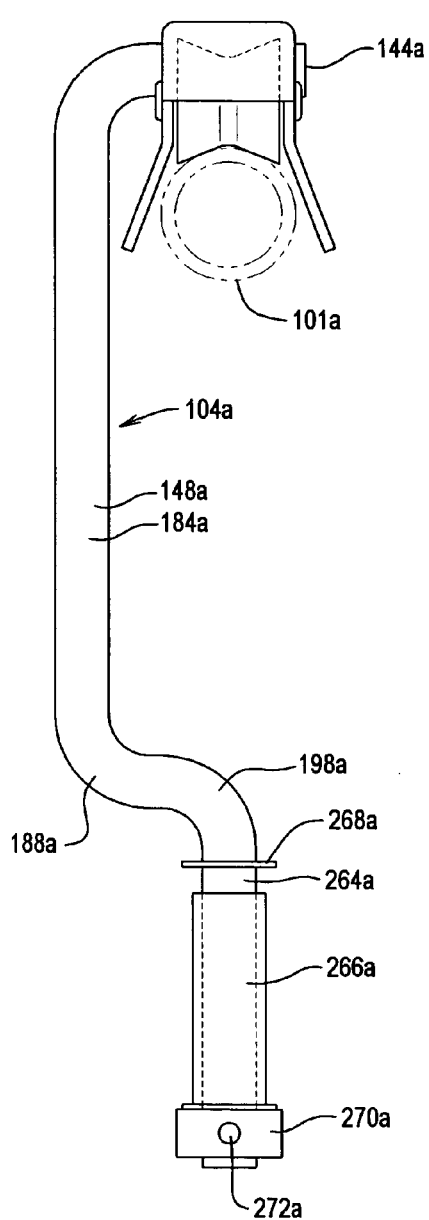
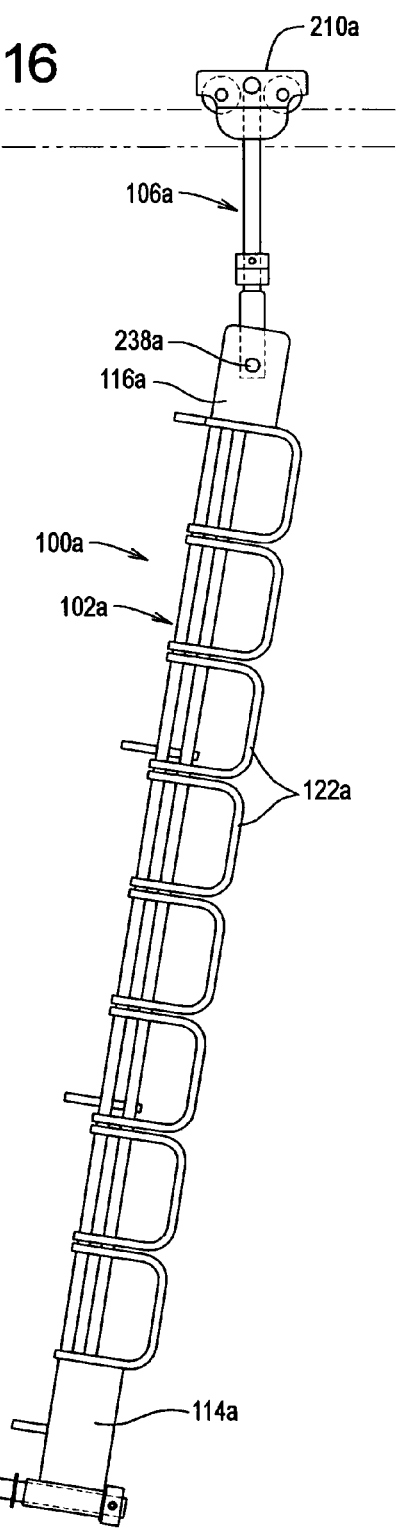

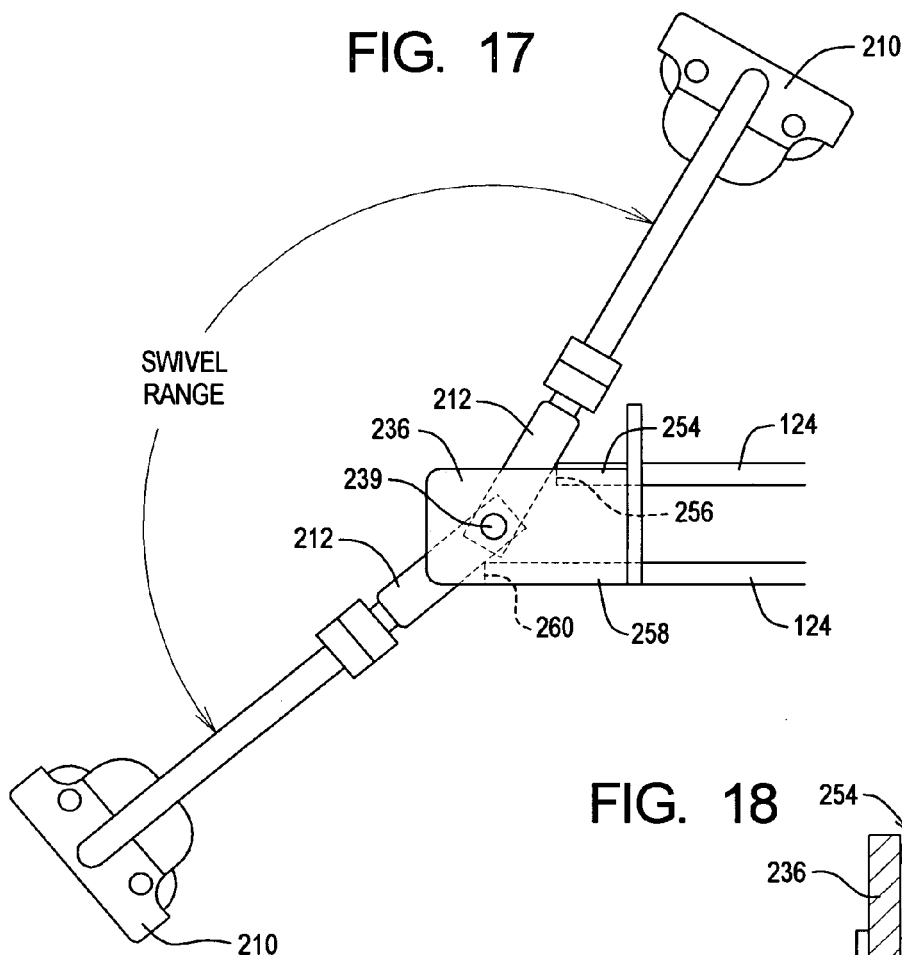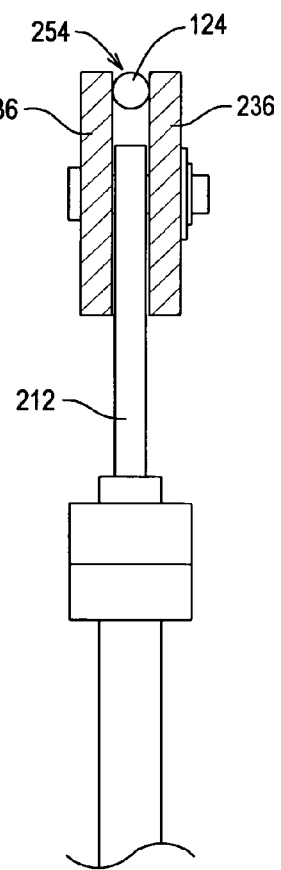

CLOTHING TRANSPORT AND STORAGE SYSTEM, APPARATUS AND METHOD

RELATED APPLICATIONS

This application claims priority benefit of U.S. Ser. No. 60/526,682 filed Dec. 2, 2003.

BACKGROUND OF THE INVENTION

A. Field of the Invention

The present invention relates generally to the handling, transport, and/or storage of items, such as wearing apparel which are hung on hangers, and more particularly to a method which is particularly adopted to be used in present day distribution systems for wearing apparel.

B. Background Art

In the garment industry, it is common that the garments that are made at a manufacturing location are shipped to a distribution center, and at the distribution center the garments are sorted out and delivered to various end user locations, such as retail stores or a warehouse. Such a prior art distribution system is illustrated schematically in FIG. 1.

As shown in FIG. 1, this prior art distribution system 10 comprises a distribution center 12 which has an in-bound location 14 at which the garments or other merchandise are received at the distribution center 12, for example from a factory, and an out-bound location 16 at which the garments are sent from the distribution center 12 to an end location, such as a retail store or a warehouse, these being shown schematically in FIG. 1 and identified by the numeral 17. As shown herein, and as is common in this industry, the in-bound and out-bound locations 14 and 16, respectively, are positioned on opposite sides of the distribution center facility 12.

There is shown in FIG. 1 several trucks or semi-trailers 18 which are positioned to deliver merchandise to the distribution center 12, and in this instance the merchandise are garments or other items of apparel. These items of clothing or garments could be delivered, for example, in crates. The crates are unloaded and the garments removed therefrom, and then these garments are placed on hangers at a sorting location 20 which would be at a location convenient to the in-bound location 14.

The main function that is performed at this sorting location 20 is to sort through the various merchandise that is received and arrange the merchandise to be sent to the various intended locations. In a typical situation, there would be available at the sorting location 20 a plurality of orders which have been placed by various warehouses or retail stores. Then, the items of clothing on a certain order would be selected from the garments within those types so that the correct number of the various types of garments could be sent to a particular store or warehouse location. There is shown schematically a table 22, and the table 22 or the tables could be used by workers to assist them in going through this sorting process.

There is shown schematically in FIG. 1 a rail system 24, and this rail system 24 has a garment loading location 26 and a garment unloading location 28. To move these garments, there are provided transport units 30, one of which is shown in FIG. 1A. This prior art transport unit 30 has been in use for a number of decades, and comprises front and rear roller assemblies 32 and 33, respectively, which in the operating position are located on top of and in engagement with a rail 34 that is part of the rail system 24. There are forward and rear vertically aligned end support members 36, each having an upper connecting portions 38 to connect to its related roller assembly 32 or 33 and a lower connecting portion 40. There is an elongate garment support member 42 in the form of a rod, having front and rear end portions 44 and 45, respectively, that are rigidly connected to the lower connecting portions 40 of the end support members 36 to make the end support members 36 and the garment support member 42 a rigid structure. The clothing hangers with the garments or other clothing thereon are hooked onto the elongate garment support member 42 for transportation.

After an individual transport unit 30 has the garments loaded thereon, this transport unit 30 moves through the rail system 24 to arrive at its truck loading location 28.

The transport units 30 that carry the apparel from the in-bound location 14 to the out-bound location 16 can be moved along the rail system 24 manually by a person pushing on the transport unit 30 or on the garments which are suspended therefrom. However, quite often a mechanical conveying system is used in distribution centers to move the transport units 30 through the rail system 24. A portion of this conveying system is shown in FIGS. 1B, 1C, 1D, 1E, 1F, and 1G, and this will be described later in this text.

The loaded transport units 30 travel through the rail system 24 and arrive at the truck loading location 28. There would be other trucks or semi-trailers 18 at the truck loading location 28 to receive the garments, and many of these trucks 18 would be equipped with rails. The transport units 30 are then moved through transition connecting rails onto the rail system in that particular truck. Then when the truck delivers the garments to the end location 17 (e.g., a retail store), the transport units 30 could be unloaded from the trucks 18 by moving the transport units 30 along the rails in the truck 18 into the receiving area at the end location 17.

Once the clothing garments are unloaded from the truck 18 at the end destination 17, such as a retail store, these can be handled in various ways. The garments or other clothing items could be possibly moved onto an existing rail system in that particular store or warehouse and carried to a desired location. Alternatively, the hangers with the clothing thereon could be taken from the transport unit 30 and hung on a rail of a wheeled cart and taken into the desired location or handled in some other manner.

To describe the rail system 24 in more detail, reference is made to FIG. 1. At the garment loading location 26, there is a plurality of garment loading rail sections 46, with each rail section 46 supporting one of the transport units 30 which is being loaded with garments or other articles of clothing. These garment loading rail sections 46 at the garment loading location 22 form an inbound rail region 47 followed by a converging rail region 48 where the various rails sections 46 converge with one another to lead into an induction region 50.

This induction section 50 in turn leads to a main rail region 52 which can be considered as an intermediate rail region 52 which is shown herein as a single rail that continues from induction rail region 50. In some larger distribution centers, this main rail region 52 may extend over a relatively large distance, and could even go from one building to another, sometimes traveling at an uphill slant, on a level portion, and then on a downward slant to a following location. Also, it could comprise a plurality of rail sections having switching locations, etc.

At the end of the main rail region 52, there is a diverging rail region 54 where the various transport units 30 are switched off from the main rail region 52 and into a number of separate rails at this diverging rail region 54. The rails from the diverging rail region in turn lead into the out-bound rail region 56 where the rail units 30 with the garments still being carried thereon are moved into rails that are on the individual trucks 18. In this prior art arrangement, each of the transport units 30 with the garments loaded thereon moves into the truck 18 to be carried to one of the end destinations 17. Then at a later time, these transport units 30 are carried from the end destinations 17 by truck back to the distribution center 12 to be again moved to the garment loading rail sections 46.

As indicated earlier in this text, there is quite often provided a mechanical conveying system to move the transport units 30 through the rail system 24. To describe one such conveying system 58, reference is now made to FIGS. 1B–1G, which comprise six figures that show the induction section 50 and the sequence of the transport units 30 having been moved from the converging section 48 are now moving through the induction section 50, and from thereon to the main rail section 52. The rail system 24 and the conveying system 58 function together as a rail/conveying system 24/58 with the rail system and conveying system functioning as cooperating subsystems 24 and 58, respectively.

With reference first to FIG. 1B, there is shown the induction section 50, and a portion of the conveying system 58 This conveying system 58 comprises an endless conveying chain 60, a portion of which is shown at FIG. 1B. There is mounted to the conveying chain 60 a plurality of pairs 62 of front and rear conveying element 64 and 66 which are designated as "hard dogs 64 and 66", respectively, in the text which follows. The pairs 62 of the hard dogs 64 and 66 are arranged so that the pairs 62 are spaced at even distances along the conveying chain 60, with the spacing distance between each pair 64 and 66 being indicated at 68 in FIG. 1B. In the following text the term "conveying chain" is used in a broader sense and is meant to include various devices, mechanisms, or systems to move the conveying elements along the conveying path. Each portion of the endless conveying chain 60 extending between any two adjacent pairs 62 of hard dogs 64–66 is referred to as an "engaging section 69" of the conveying chain 60, and this engaging section 69 has an engaging length dimension or distance which is indicated at 70. The engaging distance 70 of each engaging section 69 is moderately greater than the lengthwise dimension 71 of each of the transport units 30.

The induction region 50 of the rail system 24 is located between the inbound rail region and the intermediate or main rail region and comprises an in-feed rail section 72, the rear end of which is immediately adjacent to the forward end of the converging section 48. This in-feed rail section 72 is a single elongate rail section that has sufficient length so as to accommodate a plurality of the transport units 30 being mounted along its length in end-to-end relationship. This could accommodate, for example, as many as ten to fifteen transport units 30. This in-feed rail section 72 has a moderate downward slope in a forward direction so that when the transport units 30 are moved from the converging section 48 onto the induction region 50, these are gravity fed in a forward direction along the induction section 50.

The forward end of the in-feed rail section 72 joins at a pivot connection 74 to a rear end of an induction rail member 76, with this induction rail member 76 having a moveable front end portion 78. The induction rail member 76 is arranged so that the front end portion 78 of the induction rail member 76 can move rotatably a short distance upwardly and downwardly about the pivot connection 74 between a lower position as shown in FIG. 1B, and an upper position as shown in FIG. 1D. In the upper position of FIG. 1D, the moveable forward end portion 78 of the induction rail member 76 is aligned with a rear end portion 80 of the main rail section 52, and in its down position as shown in FIGS. 1B and 1C, the forward moveable end portion 78 of the induction rail member 76 is a short distance below the rear end portion 80 of the main rail section 52.

A stop member 82 is located at the rearwardly facing surface of the rear end portion 80 of the main rail section 52, and extends a short distance downwardly therefrom. An actuator 84 is provided to move the forward moveable end portion 78 of the induction rail member 76 upwardly and downwardly between its aligned position of FIG. 1D, and its down position as shown in FIGS. 1B and 1C.

A sensor 86 is provided at a location which is a short distance rearwardly of the stop member 82, and this sensor 86 has a detecting device which is shown herein as a finger 88 that is positioned so that it is able to engage each of the forward vertical end support members 36 of each transport unit 30 that passes by the sensor 86. Also, there is a retaining device 90 which is located (or closely adjacent to) the pivot location 74 of the induction rail member 76. This retaining device 90 is shown as a pivotally mounted arm member which has a non-retaining position (as shown in FIG. 1B), and a retaining position (as shown in FIG. 1C) where it is positioned to engage a forward support member 36 of a transport unit 30 to retain that transport unit 30 and then release it so the transport unit 30 will roll onto the induction rail member 76.

Let us now review the operation of this induction section 50 in moving the transport units 30 from the converging section 48, through the induction rail section 50, and onto the main rail section 52.

In FIG. 1B, the induction rail member 76 is in its down position, with several transport units 30 mounted in line on the in-feed rail section 72, and the retaining member 90 has moved to its retracted position to release the most forward transport unit 30-1 so that it can roll onto the induction rail member 76. With the in-feed rail section 72 having a forward and downward slope, by gravity feed the several transport units 30-1, 30-2, 30-3, and 30-4 roll downwardly and forwardly until the most forward transport unit 30 engages the stop member 82. At the same time, the rear vertical end support member 36 of the forward-most transport unit 30-1 is just forward of the location of the retaining member 90. The retaining member 90 moves from the position of FIG. 1B to its retaining position of FIG. 1C, where it is just forward of the forward end support member 36 of the transport unit 30-2 which is immediately behind the transport unit 30-1 that is now positioned substantially entirely on the induction rail member 76.

The system is arranged so that when the leading transport unit 30-1 has moved to the position where the forward roller assembly 32 is in contact with the stop member 82 (see FIG. 1C), there is a pair 62 of hard dogs 64 and 66 that are now being carried by the conveying chain 60 over induction rail member 76, but is positioned a short distance rearwardly of the forward roller assembly 32 of the leading transport unit 30-1. The actuator 84 is energized to move the moveable forward end portion 78 of the induction rail member 76 upwardly into its upper aligned position (see FIG. 1D).

As shown in FIG. 1D, the leading transport unit 30-1 is still positioned on the induction rail member 76, and the forward hard dog 64 has already engaged the forward roller assembly 32. Each forward hard dog 64 has a pivot mounting at 92 so that it is able to swing rearwardly (i.e., in a counter-clockwise direction as seen in FIG. 1D), so that the forward hard dog 64 simply rotates to slide over the forward roller assembly 32. However, when the forward hard dog 64 has passed over the forward roller assembly, the forward hard dog 64 drops downwardly to its vertical position where it is blocked from any further forward rotational movement.

As shown in FIG. 1E, the rear hard dog member 66 has now engaged the front roller assembly 32 and has moved the transport unit 30-1 a short distance forwardly. Also, the next transport unit 30-2 has moved a short distance forward to engage the retaining device 90. In this position of FIG. 1E, the forward roller assembly 32 of transport unit 30-1 is now confined to be positioned between the forward and rear hard dogs 64 and 66 of that particular pair 62. Therefore, at such time as the conveying chain 60 moves the transport unit 30-1 to a location of the main rail section 52 that has a downward and forward slope, the transport unit 30 is constrained by the forward hard dog 64 from over-running the pair 62 of hard dogs 64 and 66.

As the conveying chain 60 moves a short distance further forward from the position of FIG. 1E to the position of FIG. 1F, the rear roller assembly 33 of the transport unit 30-1 is just about to pass the location of the forward moveable end portion 78 of the induction rail member 76. Also, the next adjacent pair 62 of hard dogs 64 and 66 is positioned over a rear portion of the induction rail member 76. At this time, the finger 88 of the sensor 86 detects that the rear vertical support member 36 of the forward-most transport unit 30-1 is passing from the location of the moveable forward end portion of the induction rail member 76, and this sends a signal that causes the actuator 84 to move the forward moveable end portion 78 of the induction rail member 76 downwardly to the position of FIG. 1G. Also, at the same time, the signal generated by the sensor 86 results in the retaining device 90 moving to its release position (as shown in FIG. 1G), after which the next transport unit 30-2 moves into the induction position where it is on the induction rail member 76, and it is ready to be lifted into the position of FIG. 1D to be engaged by the following pair 62 of hard dogs 64 and 66.

It is to be understood that the rail system 24 and the conveying system 58 are operatively connected to a control section which could be a micro-computer, so that the location of the pairs 62 of the hard dogs 64–66, the action of the actuator 84, and the input from the sensor 86 are fed into the control system so that all these are properly synchronized to accomplish the sequence of operation as described herein and as shown in FIGS. 1B–1G.

After each trolley unit 30 is moved from the induction location of the induction rail member 76 and onto the rail in the main rail region 52, the endless conveying chain 60 continues to move each trolley unit 30 along the main rail section 52 toward the diverging rail region 54. In order for this control system to move each trolley unit to the correct out-bound location, at the time that each of the trolley units are on the rail at the garment loading rail section 46, and after the allotted garments have been loaded onto the garment support member or rod 42, the garments are generally covered with a garment bag and an encoded identification tag is placed on the garment tag. Then, when the garment bag is traveling over the main rail region 52, it reaches an identifying location where the encoded tag is read by an identifying device, and the information from that tag is in turn forwarded to the control system which controls the various switches which would exist in the diverging rail section 54 which leads to outbound rails that comprise the outbound rail region 56.

This control system operates the various switches in a manner so that each of the transport units 30 are guided to the proper location of the appropriate truck 18 which is to go to the end location 17 to which the garments on that particular transport unit 30 intend to be delivered.

A search of the U.S. patent literature disclosed a number of patents, and these are described briefly below.

U.S. Pat. No. 5,501,345 (Hilstolsky et al.) shows a garment holder assembly 10 which is shown in the patent as being used in conjunction with a conventional transport unit 15/17, such as shown at 30 in FIG. 1A, and described previously herein. FIGS. 4 and 6 from this Hilstolsky patent are shown in the drawings of this patent application as FIGS. 1H and 1J. The numerical designations which appear in FIGS. 1H and 1 J are the same as shown in FIGS. 4 and 6 of the Hilstolsky patent The garment assembly 10 of the Hilstolsky patent comprises a rigid wire support structure 12 having dividers 14 at spaced locations in the rigid wire structure 12. This wire support structure 12 can be deployed in two positions, namely a horizontal position as shown in FIG. 1H, where it is removably hung to a horizontal member of the transport unit 15/17, such as shown at 30 in FIG. 1A and a vertically aligned position as shown in FIG. 1J, where an end portion of the rigid wire support structure 12 is suspended from the rail 13 by means of a link 26 that connects to a roller hook 27 that in turn engages the stationary rail 13.

U.S. Pat. No. 5,107,996 (Whitaker) shows what is termed an "Apparatus for the Suspension Storage of Articles of Clothing" where there are two mounting hooks 12a and 12b that engage a horizontal garment rod 14, and a brace element 16 having through holes 24 and extending between the two hooks 12a and 12b. The clothes hangers are hung from the openings 24 and the brace element 22 has vertically aligned and horizontally aligned positions.

U.S. Pat. No. 4,872,568 (Lahmann) discloses what is termed a "Coat Hanger Suspending Device" where there are two hook members 6 that engage a horizontal pole 3, and an elongate rod member 2 extending between the hook members 6. The hangers are hung through holes 4 in the elongate member 2, and the elongate member 2 can be positioned in a horizontal or a vertical position.

U.S. Pat. No. 4,429,797 (Collins) discloses what is termed a "tie caddy" which comprises an elongate member 10 called a "spine" on which are mounted pairs of arms 26. There is a loop connector 12 at one end and a hook 20 at the other end. This device can be hung with the spine extending horizontally to support the ties or extending vertically.

U.S. Pat. No. 5,050,833 (Usner) discloses an "Angled Roller Device for Multiple Garment Hanger Rope/Sling" which comprises an arcuate hook having three rollers thereon which engage an elongate rod. There is a loop at the lower end, and there is a rope sling that hangs downwardly and is engaged by the hooks of several clothes hangers.

U.S. Pat. No. 2,425,146 (Commis et al) discloses a collapsible clothing hanger where there is an elongate supporting bar 17 having a plurality of spaced slots on which clothing hangers 32 can be hung. This supporting bar 17 can be moved relative to a link 16 which has pivot connecting locations at 20 and 22 between a horizontal and a vertical position.

U.S. Pat. No. 5,697,508 (Rifkin et al.) shows what is termed "Trolley and Bag Assembly for Transporting Hanger/Hung Garments." There is a trolley and bag assembly to transport hanger/hung garments on overhead rails. There is a retractable hold-down bar having a raised position and a lower position where it clamps the hooks of the hangers.

U.S. Pat. No. 4,079,840 (Usner) discloses a trolley bar that is hung from a trolley rail and is removable therefrom.

There is provided a bridle which is shown in FIG. 2 in its locking position on the trolley bar, and in FIG. 3 shows it in its unlocked position.

U.S. Pat. No. 4,037,728 (Cameron) discloses a trolley 10 having first and second roller assemblies 11 and 12 riding on a rail 13. There is provided a clamping bar by which the hooks of the hangers are clamped to the hanger bar.

BRIEF DESCRIPTION OF THE DRAWINGS

FIGS. 1B–1G are six side elevational views showing a portion of a rail and conveying system, with these being sequential views showing the movement of a transport unit through a portion of this system;

FIG. 2 is a side elevational view of a transport unit of a first embodiment of the present invention, with a carrier section of the transport unit being shown in its horizontal orientation;

FIG. 3 is an elevational view taken from a position at a forward end of the transport unit, this being taken from a location at the left-hand side of FIG. 2;

FIG. 4 is an end elevation view taken from a position behind the rear end of the transport unit, looking forwardly toward the transport unit;

FIG. 8 is a sectional view taken at line 8—8 of FIG. 4;
FIG. 9 is a sectional view taken at the same location of FIG. 8 and showing the same subject matter as in FIG. 8, however with the roller unit being tilted, relative to the position of FIG. 8;

FIG. 12 is an isometric view showing a garment bag utilized in the embodiments of the present invention, the garment bag being in its open position;

FIG. 13 is a side elevational view showing the garment bag of FIG. 12 being in its functional position enclosing the hangers and the area beneath the hangers which would be occupied by the clothing, with the upper end of the bag being connected to the carrier section of the transport unit;

FIG. 14 is a side elevational view similar to FIG. 2, showing a second embodiment of the transport unit of the present invention;

FIG. 15 is view similar to FIG. 3, this being a side elevational view taken from a location forward of the transport unit of FIG. 14 of the second embodiment, and looking rearwardly at the transport unit;

FIG. 16 is a side elevational view similar to FIG. 11, showing the transport unit of the second embodiment in its downwardly extending vertical orientation;

FIG. 17 is a side elevational view showing a rear portion of the transport unit; and, FIG. 18 is a sectional view taken along line 18—18 of FIG. 17.

DESCRIPTION OF THE PREFERRED EMBODIMENTS

Figure 1:
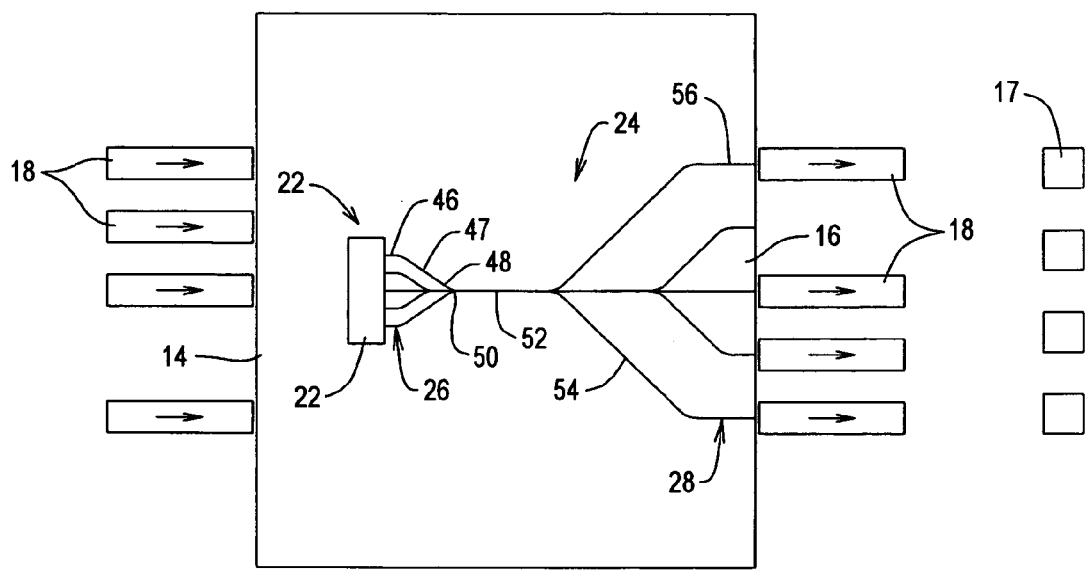
FIG. 1 is a schematic drawing illustrating a prior art distribution system in which the embodiments of the present invention can be utilized.
Figure 1A:
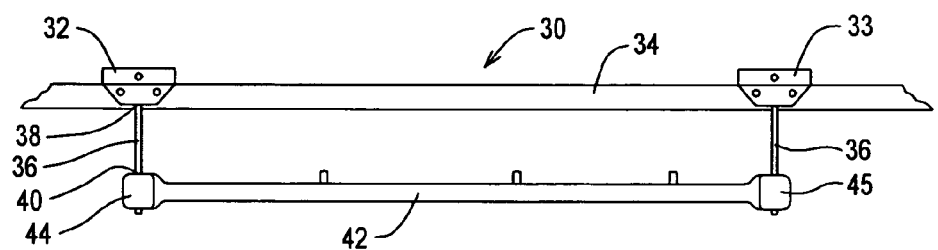
FIG. 1A is a side elevational view illustrating a prior art transport unit which has been used in the garment industry for several decades.
Figure 1F:
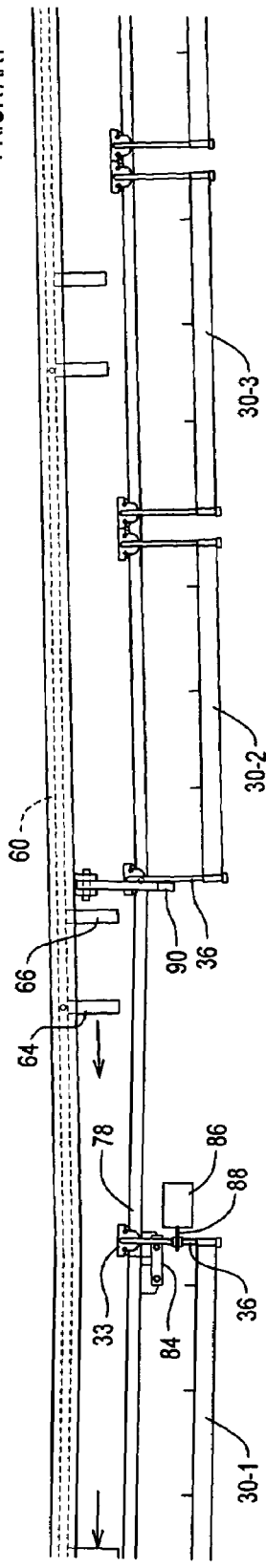
Figure 1G:
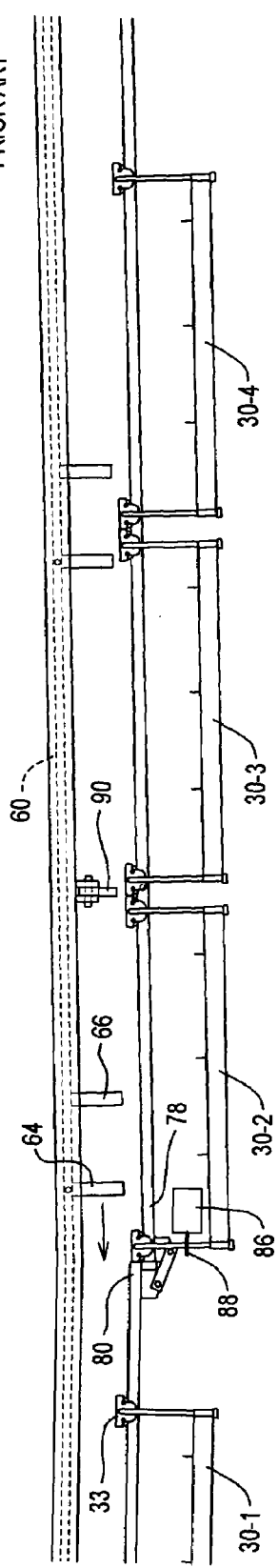
Figure 1H:
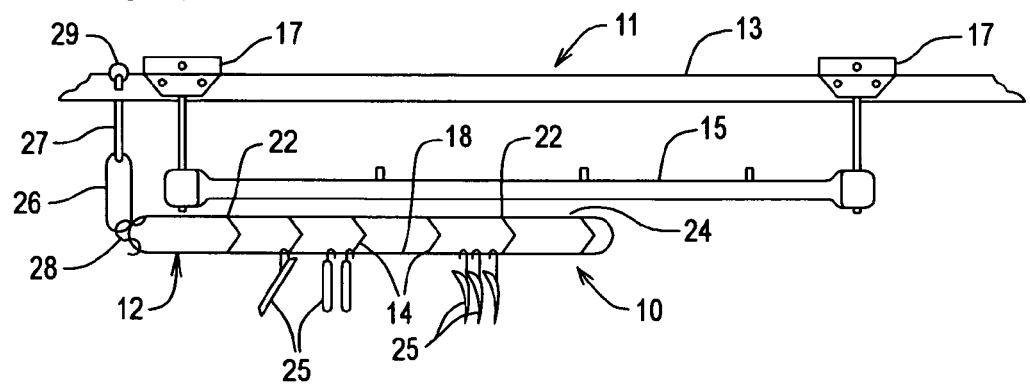
FIGS. 1H and 1J are side elevational views showing a prior art garment holder assembly.
Figure 1J:
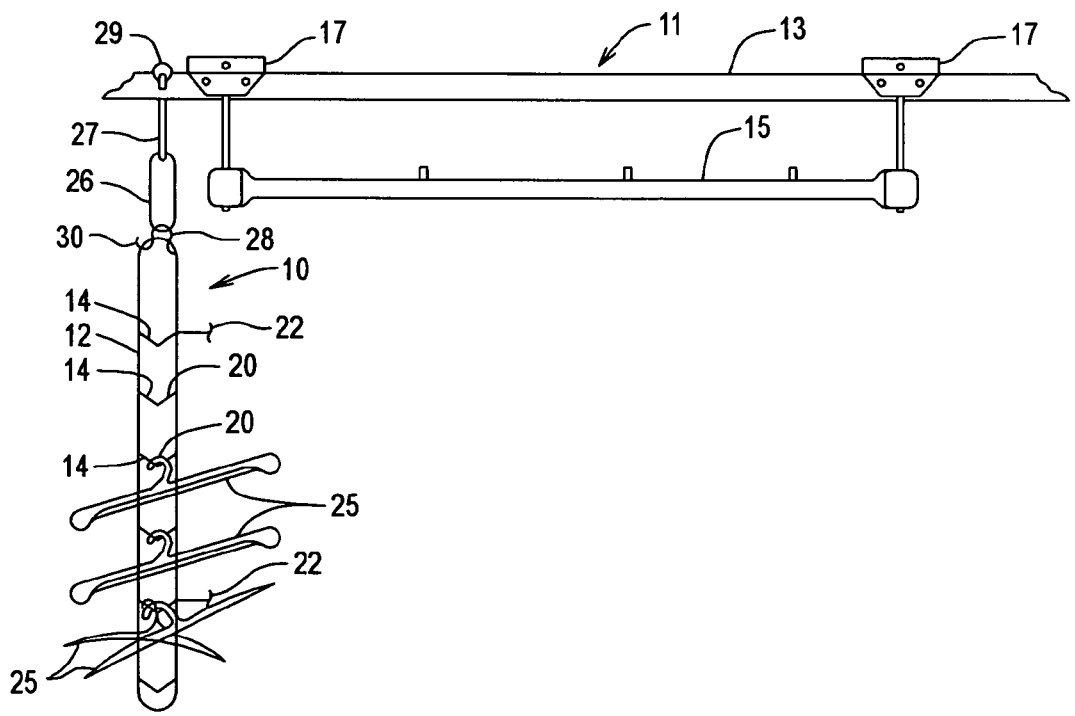
Figure 5:
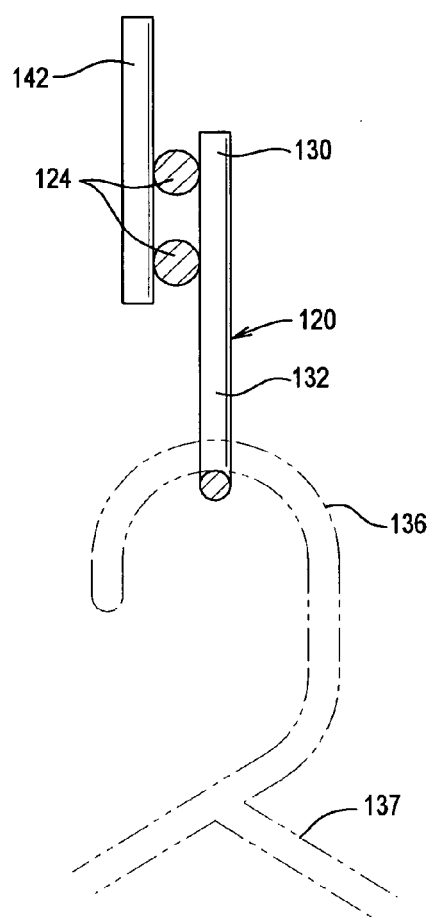
FIG. 5 is a sectional view taken at line 5—5 of FIG. 2.

At the introductory portion of this text, it was indicated that the system, apparatus, and method of the present invention are particularly adapted to be used in present-day distribution systems, as described earlier in this text with reference to FIG. 1 and FIGS. 1A–1G.

In the present invention, there is provided a transport unit 100 which is particularly adapted to be used in the transportation system 10, such as shown in FIG. 1, and FIGS. 1B–1G. However, with the present invention, it is not necessary to utilize the transport unit 30 which is described earlier in this text with reference to FIG. 1A. Rather, the transport unit 100 of the first embodiment of the present invention is used.

With the foregoing being given as background information, let us now turn our attention to the first embodiment of the present invention which is shown in FIGS. 2–13. With reference to FIG. 2, there is shown the transport unit 100 which is in its horizontal operating position and suspended from a rail 101. This transport unit 100 comprises a carrier section 102 and forward and rear roller support sections 104 and 106.

In FIG. 2, the transport unit 100 is shown with its carrier section 102 in its horizontal orientation. To facilitate the following description, the carrier section 102 shall be considered as having a forward to rear longitudinal axis 108, a transverse axis 110 (see FIG. 4), and a vertical axis 112 (see FIG. 2).

The carrier section 102 comprises a first end portion 113 and a second rear end portion 115, which for convenience will be referred to as front and rear end portions 113 and 115, and this forward and rear terminology will be continued at least in part throughout this text. Further, there are forward and rear connecting end portions 114 and 116, and a central apparel carrying portion 118. This apparel carrying portion 118 in turn comprises a structural apparel support portion 120, and an apparel unit engaging portion 121 comprising a plurality of longitudinally spaced apparel unit support regions which in this embodiment comprise a plurality of carrier units 122, which are positioned at longitudinally spaced intervals along the apparel carrying portion 120. The structural apparel support portion 120 comprises a plurality of two or more vertically spaced longitudinally extending elongate rods 124, and this embodiment is shown having two such rods 124.

Each of the carrier units 122 has a U-shaped configuration, with a lower cross-member 126, and two side fingers 128 extending upwardly therefrom. The upper end finger portions 130 of the fingers 128 are welded or otherwise connected to the elongate rods 124 to obtain support as well as add structural strength and stability to the structural support portion 120, and each pair of the lower finger portions 132 in conjunction with the cross-member 126 define a recess or open support region 134 to receive a hook portion 136 of garment hangers 137. The term "wearing apparel" or "apparel" shall include clothing, including garments and coats or like the which are worn by a person even though these items are not commonly referred to as "apparel". The hangers 137 have an item of wearing apparel 138 hanging thereon, and each hanger 137 (or some device or arrangement functioning as a hanger) with the item of apparel is referred to as an "apparel unit 140."

Also, while only one configuration of the apparel carrying portion 118 is shown as a means for supporting the garment units 140 in both of the more horizontal and more vertical positions, other arrangements are known in the prior art, and would be possible alternatives, and the term "support regions 134" is intended to include alternative recess providing designs to perform these functions.

There is also mounted to the structural apparel support member 120 several longitudinally spaced garment bag connectors in the form of upstanding pegs 142 to connect to upper portions of a garment bag (this will be discussed further later in this text).

With reference to FIGS. 2 and 3, the forward roller support section 104 comprises a roller portion 144 at the upper end of the forward roller support section 104, a lower connecting portion 146 that connects with the forward connecting end portion 114 of the carrier section 102, an intermediate roller support portion 148 that connects at an upper end to the roller portion 114 and at a lower end to the lower connecting portion of the roller support section 104 a counter balance portion 150.

The roller portion 144 of the front support section 104 and a corresponding roller portion 210 of the rear roller support section 106 of this embodiment are substantially identical. Therefore, the following description relating to the roller portion 144 of the forward roller support section 104 is intended to apply also to the roller portion 210 of the rear roller support section 106. These two roller portions 144 and 210 are best shown in FIGS. 6, 7, 8, and 9, so these four FIGS. 6–9 are used in the following text to describe both roller portions 144 and 210.

With further reference to FIG. 2 and also with reference to FIGS. 6–9, the roller portion 144 comprises a roller housing 152 in which are positioned the front and rear rollers 154 (see FIG. 8), each of which has an axis of rotation 155. The roller housing 152 (see FIG. 6) comprises an upper cover 156, side walls 158, end walls 160 (see FIG. 8), and two downwardly and outwardly extending side skirts 162 (see FIG. 6) which slant downwardly and laterally outwardly on opposite sides of the round rail member 101.

Figure 6:
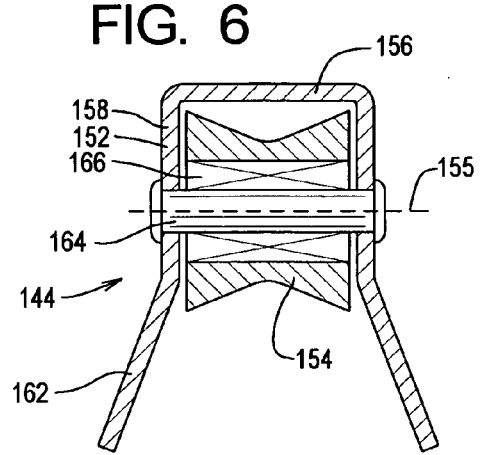
FIG. 6 is a sectional view taken at line 6—6 of FIG. 2.

To mount the two rollers 154 in the roller housing 152, there are provided front and rear roller mounting pins 164 (see FIG. 6), each of which has a surrounding bearing 166. In this embodiment, the bearings 166 are sealed bearings which prevent the entry of dust, fiber, and other contaminants that would otherwise cause premature wear. As can be seen in FIG. 6, each of these roller mounting pins 164 extends between adjacent portions of the side walls 158.

Figure 7:
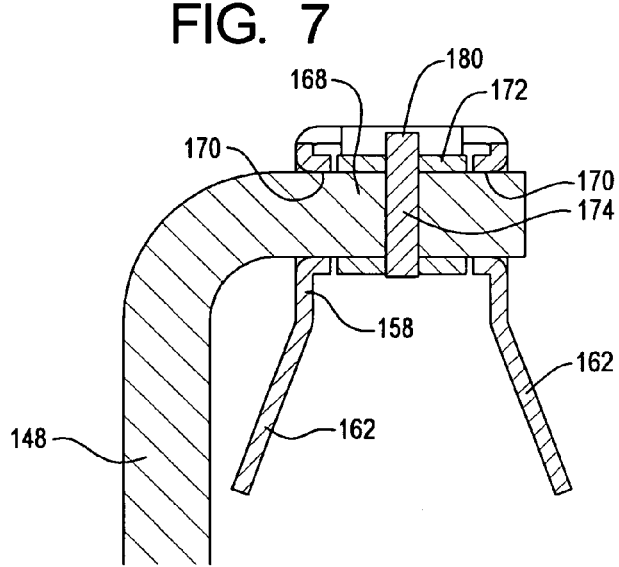
FIG. 7 is a sectional view taken at line 7—7 of FIG. 2.

To connect the entire roller portion 144, as can be seen in FIGS. 7, 8, and 9, there is a connecting finger 168 which is made integrally with the intermediate portion 148 of the forward roller support section 104. This connecting finger 168 extends through two openings 170 in the housing side walls 158. There is a positioning sleeve 172 which surrounds the connecting finger 168, and a retaining pin 174 extends through aligned openings in both the positioning sleeve 172 and the connecting finger 168.

It will also be noted in viewing FIG. 8, that there is an upper center open area 176 in the upper cover 156 of the roller housing 152, and there are two down-turned members 178 which are on opposite sides of an upper end 180 of the retaining pin 174. Thus, as can be seen in FIGS. 8 and 9, the combination of the retaining pin 174 and the members 178 serves as a stop or limiting mechanism which limits the rotational movement of the roller portion 144 relative to the intermediate portion 148.

In this embodiment, the center locations of the two rollers 154 are spaced from each other approximately two inches, and this has been found to be satisfactory. This dimension of the spacing of the rollers 154 could be increased or decreased in either or both of the roller portions 144 and 210. For example, this two-inch dimension could possibly be for situations be increased by as much as three inches, four inches, or possibly five, six, seven, eight, nine or ten inches higher. However, for most situations there would be disadvantages in doing so.

The intermediate portion 148 (see FIG. 3) comprises an elongate cylindrical rod-like member 180, comprising a vertically aligned central portion 184 having at its upper end a ninety degree curved portion 186 which connects to the aforementioned connecting finger 168. At the lower end of the vertically aligned rod portion 184, there is a lower ninety degree curved portion 188 which connects to a horizontal support portion 190. At the horizontal support portion 190, there is the aforementioned lower connecting portion 146 of the roller support section 104 in the form of an upwardly extending connecting member 192 which is shaped as a vertical cylindrical member with a base 194 connected to the horizontal support portion 190. The upper end 196 of the member 192 is inwardly and upwardly tapered in a frusto-conical configuration.

The horizontal support portion 190 leads into a third ninety-degree curved portion 198 which has at its lower down-turned end portion a counter-balancing weight 200, which may have a cylindrical configuration. It will be noted in FIG. 3, that the forward roller support section 104 is vertically aligned in a manner that the connecting member 192 is vertically aligned with a point that is midway between a line extending between the two grooves 202 which are present in the two rollers 154. The positioning of the counter-balancing weight 200 relative to the entire structure of the forward roller support section 104 is such that when the forward roller support section 104 is hanging by itself freely from the rail 101, the effect of the counter-balancing weight 200 is that the connecting member 192 is vertically aligned along an alignment axis 203 with the point between the center grooves 202 of the rollers 154.

Reference is now made to FIG. 2, and particularly to the forward end connecting portion 114 of the carrier section 102. This forward end connecting portion 114 comprises a plate-like member 204 which is welded or otherwise bonded or connected to the adjacent end portions elongate rods 124 of the structural apparel support portion 120. At the outer end of the plate-like member 204, there is a cylindrical vertically aligned mounting sleeve 206 which has a vertical cylindrical through opening that fits closely around the connecting member 192. Thus, it can be seen that with the cylindrical mounting sleeve 206 engaging the vertical cylindrical connecting member 192, the alignment axis 203 (see FIG. 3) of the forward roller support section 104 is restrained to be at a right angle to the longitudinal axis 108 and to the transverse axis 110 of the carrier section 102. Thus, in the position of FIG. 2, the forward roller support section 104 is constrained to remain in its fixed right angle position relative to the carrier section 102 unless it is moved out of engagement with the mounting sleeve 206. Also, the removable connection of the connecting member 192 and the sleeve 206 permits relative rotation about the alignment axis 203 between the forward roller section 104 and the carrier section 102. It is also to be noted that while the mounting sleeve 206 and the vertical connecting member are described as being cylindrical, this terms "cylindrical", as well as other terminology in this description is not intended to necessarily be interpreted as limitations to be read into the appended claims. Rather, such descriptive text is intended to give a more complete description of the embodiments, and not to present claim limitations.

Reference is now made to FIG. 4 which shows the rear roller support section 106 from a location rearwardly of the rear of that section 106. This rear roller support section 106 comprises a roller portion 210 (mentioned earlier in this text), a lower connecting portion 212, and an intermediate portion 214 connecting the roller portion 210 to the lower connecting portion 212. As indicated earlier in this text, the roller portion 210 is, or may be, the same at the roller portion 144 and the earlier description with reference to FIGS. 6–9 of the roller portion 144 applies as well to the roller portion 210.

The intermediate portion 214 comprises a rod-like member 215 that comprises an elongate vertically aligned portion 216 which connects to an upper connecting finger 218 (serving a similar function as that of the connecting finger 168 of the forward roller support section 206), and which is joined to the upper end of the vertically aligned portion 216 by a right angle portion 220. The lower end of the vertically aligned portion 216 has a lower right angle bend portion 222 that connects to a horizontal lower finger 224, which in turn connects to a vertically oriented connecting sleeve 226 which defines a vertically aligned cylindrical recess.

There is a cylindrical member 228 which is rotatably mounted in the connecting sleeve 226, and the upper end of the cylindrical member 228 is fixedly connected to a collar 229 that bears against the connecting sleeve 226. The connecting sleeve 226 and the cylindrical member 228 collectively comprise a rear rotatable connection which permits relative rotation about a vertically aligned rear axis of rotation. The lower end of the cylindrical member 228 is fixedly connected to (or made integral with) a downwardly extending bar 230, which is thus rotatably mounted relative to the connecting sleeve 226. The bar 30 has flat parallel oppositely positioned faces 232. This bar has a generally aligned elongate rectangular configuration. There is a retaining pin 234 that fixedly connects the collar 229 to the cylindrical member 228.

With further reference to FIGS. 2 and 4, the rear connecting end portion 116 of the carrier section 102 comprises a pair of rectangular plates 236 which are in parallel alignment with each other and spaced a short distance from each other to define a longitudinally and vertically aligned mounting space. There is a pivot pin 238 which extends through three aligned openings, namely two openings in the two side plates 236 and an opening in the bar 230 of the lower connecting portion 212 to establish an axis of rotation 239. The two inner surfaces 240 of the side plates 236 are closely adjacent to the flat parallel faces 232 of the downwardly extending connecting bar 230, and these are arranged so that the carrier section 102 can rotate a full ninety degrees and greater from the horizontally oriented position of FIG. 2 to a downwardly extending position where the carrier 102 is positioned in its vertical orientation (see FIG. 11), but is restrained to rotate about the transverse axis of rotation 239 established by the pivot pin 238. The pivot location 238 and the connecting member 192 are spaced from one another at a fixed distance from one another so that the lower connecting end portion 114 and 116 of the roller support sections 104 and 106 are likewise at fixed locations relative to one another.

With further reference to FIG. 4, there is a vertical alignment axis 241 of the rear roller support section 106 that extends from a location which is centered between the two grooves 202 of the rollers 154 extending downwardly through a center line of the lower connecting portion 212 and through a central location of the pivot pin 238. Thus, with the front roller support section 104 in its connected operating position of FIG. 2, the forward and rear roller support sections 104 and 106 are thus constrained so that the two alignment axes 203 and 241 remain in the same generally vertically and longitudinally aligned plane that is occupied by the carrier section 102, and thus by the entire transport unit 100, while the forward and rear roller assemblies 144 and 210 are able to rotate about their respective alignment axes 203 and 241.

Reference is now made to FIGS. 12 and 13 which show a garment bag 242 which may be used in this first embodiment, as well as in the second embodiment. This garment bag 242 has or may have a conventional design, and comprises a surrounding side wall 244 which is closed at the bottom, and an upper edge portion 246 defining a top opening. The top edge portion 246 is formed with through openings in the form of grommets 248. After the hangers and the articles of clothing thereon are placed in their carrying positions on the carrying section 102, the garment bag 242 can be moved upwardly around the articles of clothing on the hanger and connected to the garment bag connectors 142, as illustrated in FIG. 13.

To describe now the operation of the first embodiment of the present invention, this will begin by describing how this embodiment can be used in the prior art distribution system 10 of FIG. 1. Let us assume that the garments have been received from the trucks 18 at the in-bound location 14 of the distribution center 12, with the garments having been sorted at the sorting location 20. Several of the transport units 100 are positioned so that each is suspended by both roller support sections 104 and 106 in a horizontal first operating position from a related one of the rails at a first rail location at the inbound rail region 46 in its horizontal orientation of FIG. 2, with a plurality of garment hangers 138 carrying various items of apparel having been hung on several carrier units 122 of the carrier section 102 to be in a first horizontal support position. At this time, the garment bag 242 would usually be positioned to enclose the items of apparel and the hangers as shown in FIG. 13, with an encoded tag fastened to the garment bag 242. The transport units 100 are now ready to be moved through the rail system 24 to the out-bound location 16 of the distribution center 12.

In the following description the term "forward" shall be interpreted to mean a direction of travel from an inbound location toward an outbound along the conveying path, even though this path could entail 90 degree turns on even 180 degree turns, or to define a location along the conveying path. The term rearward or "rear" shall denote the opposite.

Then, each of these transport units 100 is moved from the inbound rail section through the converging rail section 48, so that each moves in sequence to the in-feed rail section 72, in a manner that these transport units 100 are positioned one behind the other as shown in FIG. 1B. The next step is for each of these transport units 100 to move in sequence, one after the other, through the induction zone where the induction rail member 76 is located, so that each is transferred to the main rail section 52.

At this point, it should be recalled that earlier in this text it was indicated that the arrangement of the forward roller support section 104 is such that it is connected to the carrier section 102 so that the alignment axis 203 of the forward roller support section 104 is constrained to remain at a right angle to the carrier section 102. Also, it will be recalled that earlier in this text it was pointed out that the forward and rear roller support sections 104 and 106 remain in the same longitudinally and vertically aligned plane with each other, and also with the carrier section 102. Thus, when the forward roller portion 144 of the forward roller support section 104 is engaged by the rear hard dog 66 to be moved from the induction zone onto the main rail region 52, the forward roller portion 144 remains reliably contained between its adjacent front and rear hard dogs 64 and 66. Then, when each transport unit 100 approaches the diverging rail region 54 with its identification tag being read by a transceiver device or the like, each transport unit 100 makes its way through the switching system of the diverging rail region 54 to arrive at the desired outbound location 28 (see FIG. 1).

Figure 10:
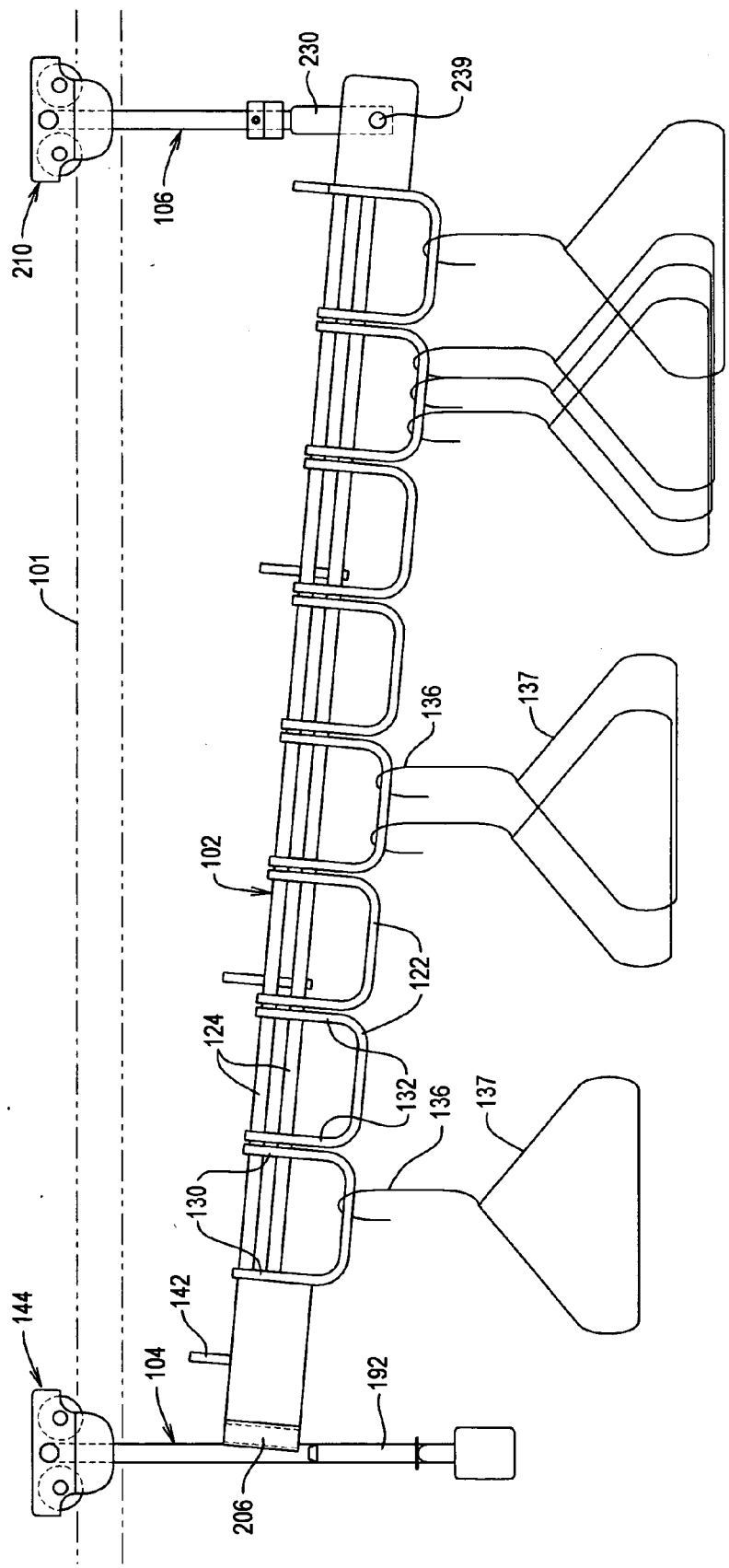
FIG. 10 is substantially the same as FIG. 2, except that the forward end of the carrier section is shown being disengaged from a forward support section of the first embodiment.
Figure 11:
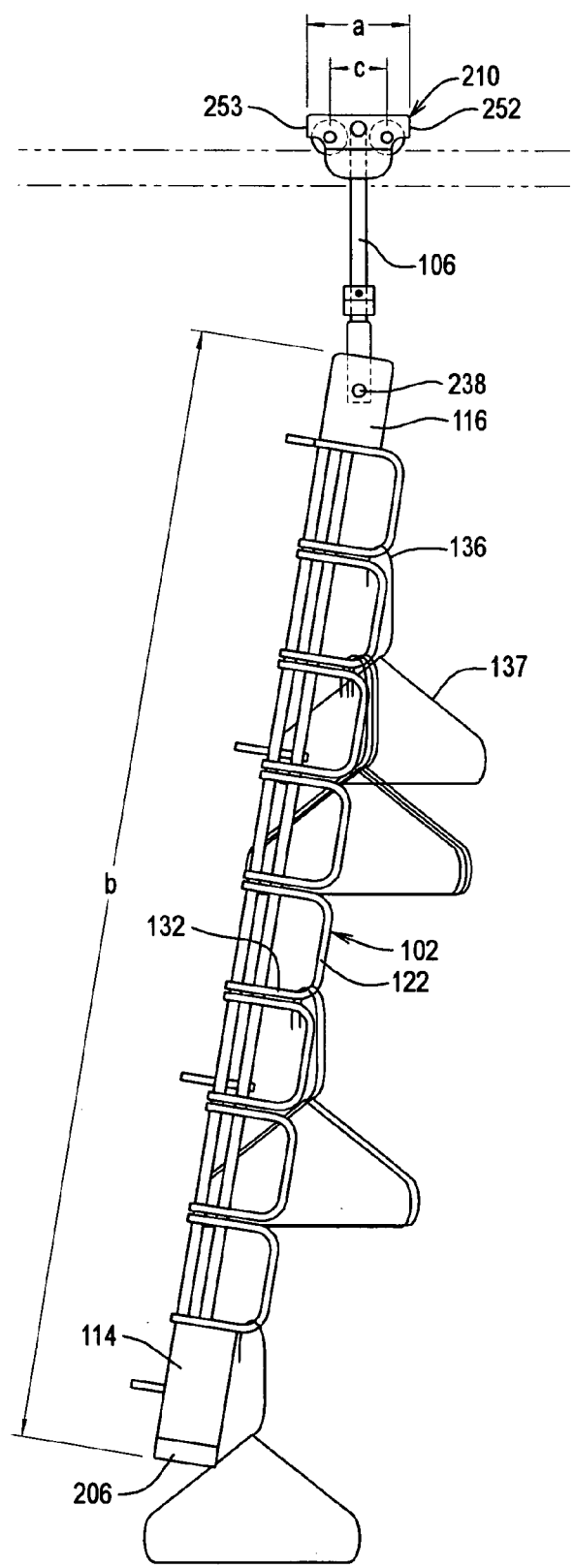
FIG. 11 is a side elevational view of the transport unit of FIGS. 2 and 10, showing the carrier section positioned in its vertical orientation.

When the transport unit 100 has reached the desired outbound location at the truck loading location 28 (which would usually be near a location where the related truck or semi-trailer 18 is positioned to be loaded), the forward end of the carrier section 102 is manually raised upwardly a short distance to the position of FIG. 10 to move the mounting sleeve 206 free of the connecting member 192, and the forward roller support section 104 is moved a short distance away, after which the forward end of the carrier section 102 is lowered downwardly about the pivot location 238 so that it is positioned in a second operating position in the near vertical or vertical orientation as shown in FIG. 11. In the position of FIG. 11, the garments are in a second more vertically aligned, supported position and positioned more closely together, and the hanger hooks move toward the side portions 132 of the U-shaped carrier units 126.

Then the transport unit 100, now supported only by its rear roller support section 106 in a second operating position, is moved further along the rail so that it passes through a transition rail connection and onto a rail in the truck 18, and moved into the truck while remaining in its vertical orientation.

When the truck 18 is loaded with the allocated load of transport units 100 with the garments, and with these transport units 100 in the more vertical orientation in the second support position, the truck 18 then travels to its end destination 17. Each transport unit 100 that is contained in the truck 18 is rolled from the rail in the truck outwardly to the rail system in the retail store or other end destination 17. In some instances, the transport units 100 are moved in the vertical orientation to a desired location in the end location 17, the garment bag 242 is taken off, and the garments or other items of apparel are then moved to another location.

In other instances, it may be desired to move the transport units 100 in the horizontal orientation to another location, and in this instance, a forward roller support section 104 at the location of the end destination 17 is placed on the rail and the forward end of the carrier section 102 is moved upwardly to the position of FIG. 10. Then the cylindrical mounting sleeve 206 is lowered onto the connecting member 192 to bring the transport unit 100 to its position of FIG. 2. In other instances the transport units 100 with the garments can remain in the second operating position, can be stored and then shipped at a later time.

In one arrangement, a number of the forward roller support sections 104 can be kept on hand at the retail store or other end destination 17 so that these can be used in connection with the various transport units 100 that come into that retail store or other end destination 17. Alternatively, the forward roller support sections 104 can be loaded onto the truck 18 along with the transport units 100 in the vertical orientation, and then the forward roller support sections 104 can be re-connected with the carrier section 102 at the end destination 17.

When the transport units 100 have been unloaded and are ready to be returned to the distribution center 12, these are then placed in a collecting location, and on a subsequent delivery from the truck 18, these transport units 100 can be picked up by the truck 18 and carried back to a location at the distribution center 12 near to the in-bound location 14, so that these can again be used at the distribution center 12.

To describe another feature of this embodiment, let us first review a problem that exists in the prior art. In some instances, a portion of the rail at the distribution center 12 is aligned in a forward and downward slant so that when the prior art transport units 30 reach that downhill portion of the rail, these transport units 30 will disengage from the continuous chain hard dogs 64 and 66 and accelerate toward the lower location. It often happens that there are already several transport units 30 at that forward lower location of the rail, and the transport unit 30 that is traveling downhill toward the end location will ram into the rearmost transport unit 30 on the rail, eventually causing damage, such as the rear vertical support end member 36 of the transport unit 30 being bent.

However, in this embodiment of the present invention (as well as in the second embodiment which is described later in this test), this problem is substantially alleviated. It will be recalled that, as indicated earlier in this text, the rear roller support section 106 is rotatably connected to the carrier section 102 at a pivot location at the location of the pivot pin 238, while the forward roller support section 104 is fixed in the upright position relative to the carrier section 102. Also, it will be noted in FIG. 2 that the furthest forward surface 250 of the forward roller housing 152 is positioned forwardly of the lower forward end surface of the carrier unit 102 (e.g. one to two inches) and the furthest rearward surface 252 is a short distance rearward of the rear surface of the carrier section 102.

Accordingly, the two proximate surfaces 250 and 252 are positioned to contact one another by the surface 250 impacting the rearmost surface 252 of the rear roller housing 152 of the rear roller support section 106 of the next forward transport unit 106 prior to the time that there is any contact between the carrier sections 102 of the two transport units 100 that meet in the impact. The result of this is that the rear roller housing 152 of the forward positioned transport unit 100, being pivotally connected to the rear end position of the carrier section 102, will give way to the forward roller housing 152 of the forward roller support section 104 of the rear transport unit 100 so as to cushion the impact. Also, as a group of garments are being carried by the transport unit 100, these will sway laterally back and forth on the rail so that the transport units sway laterally out of alignment with one another so that in most instances adjacent end portions of two adjacent transport units 100 do not impact one another when in the situation noted above, but pass by one another by a short distance.

Thus, the pivot mounting of the rear roller support section 106 provides not only the benefit of permitting the carrier section 102 to be moved relatively easily between its horizontal orientation of FIG. 2 to its more vertical orientation of FIG. 11, but it also has a cushioning effect in that it alleviates the effect of an impact from a transport unit 100 which is immediately behind. Also, the rigid connection of the front roller support section 104 relative to the forward end portion of the carrier section 102 relative to rotation about the transverse axis 110 has the benefit of making a reliable engagement with the rear hard dog 66 to the housing 152 of the roller portion 144 of the forward roller support section 104, and yet minimizes the adverse effect of possibly being bent or damaged by impacting the rear roller support section 106.

To describe another feature of this embodiment (as well as a second embodiment to be described), reference is made to FIG. 11. As indicated previously the roller housing 152 of the rear roller support section 106 has a rearwardly facing surface 252, and in addition the roller support section has a forwardly facing surface 253 of that rear roller housing 152. The longitudinal spacing distance between these two surfaces is defined as an upper end surface roller length dimension, and is indicated by the letter "a". The carrier section has first and second end surface portions that are spaced from one another by a carrier length dimension, and this is indicated by the letter "b" in FIG. 11.

In this embodiment (as well as in the second embodiment), the roller length dimension "a" is substantially smaller than the carrier length dimension "b", which can be, for example, about three feet long. Thus, when a plurality of the transport units 100 are positioned adjacent to one another in the second operating position as shown in FIG. 11, the transport units 100 can be positioned more closely together since the roller length dimension "a'" is relatively small. This roller length dimension "a" should be less than one half of the carrier length dimension, and also desirably less than one third, no greater than one quarter, or no greater than one seventh of the carrier length dimension. In the first embodiment and the second embodiment to be described hereinafter, the roller length dimension is no greater than about one tenth of the carrier length dimension. These same dimensional relationships are described above apply as well to the forward roller housing 152.

To describe yet another feature of this embodiment (as well as the second embodiment to be described) reference is again made to FIG. 11, and more specifically to the distance, indicated at "c" which is the distance (i.e. a roller center axis spacing dimension) between the centers of rotation 155 of the front and rear rollers 154 of the roller portion 144 and also of the roller portion 210. This distance should be less than one third of the carrier length dimension, and also desirable no greater than one fifth, no greater than about one seventh, no greater than about one tenth, or no greater than about one fifteenth of the carrier length dimension "b". In this embodiment the distance "c" is about one-twentieth of the dimension "b". These dimensional relationships can also apply to forward roller housing 152.

Another feature of this embodiment will now be described with reference to FIGS. 17 and 18 which show the rear end portion of the transport unit 100, with FIG. 17 being seen from a side of he carrier section 102 that is opposite to the location at which FIG. 2 is taken. In FIGS. 17 and 18, the two upper and lower elongate rods 124 of structural support portion 120 are spaced further apart from one another, with the lower rod 124 being positioned at a lower level. The upper rod 124 connects at an upper forward location at 254 between the two plates 236. The rear end 256 of this upper rod 124 is positioned above and forwardly of the pivot location 239 by a moderate distance, so that when the rear roller support section 106 is in a position to extend upwardly from the pivot location 239 and is leaning in a forward direction, its lower connecting portion 212 comes into engagement with the end edge portion 256 of the upper rod 124.

In a similar manner, the lower rod 124 is positioned between a lower portion 258 of the two side plates 236. However, this lower rod 124 has a rear end portion 260 which is positioned below and at a location moderately rearwardly of the pivot location 239. Thus, when the rear roller support section 106 has swung downwardly about the pivot location 239 as shown in the solid lines of FIG. 17, the lower connecting portion 212 contacts the rear end portion 260 of the lower rod 124 so that it extends rearwardly and downwardly at an angle which is about half of a right angle, or possibly greater relative to a vertical axis.

The benefit of this particular arrangement is two-fold. It will be recalled that earlier in this text in the description of the operation of the first embodiment of the present invention, after the garments have been delivered to an end destination, it is quite common for the transport units 100 to be removed from the rail and deposited at a collecting location where these are then taken back to the distribution center. When the transport units 100 are taken off the rail, the rear roller support section 106 will tend to rotate about the axis of rotation 239 downwardly. By having the lower end stop portion 260 acting as a stop member, the rear roller support section 106 will not swing in and strike a person's arm.

The second benefit is that when the transport unit 106 is later to be mounted back to a rail, the rear roller support section 106 is rotated to its up position as shown in FIG. 17, and thus the rear roller support section 106 will be positioned so that the roller portion 210 will be positioned to engage the rail.

A second embodiment of the present invention will now be described with reference to FIGS. 14, 15, and 16. Components of this second embodiment which are the same as, or similar to, the first embodiment will be given like numerical designations, with an "a" suffix distinguishing those of the second embodiment.

Thus, as in the first embodiment, there is the transport unit 100a, comprising the carrier section 102a and the forward and rear roller support sections 104a and 106a. The rear roller support section 106a is (or may be) the same as the rear roller support section 106 of the first embodiment, so that there is the pivot connection which permits the carrier section 102a to be rotated between its horizontal orientation of FIG. 14, to its vertical orientation of FIG. 16. Accordingly, a description of this rear roller support section 106a will not be repeated, but some of the components will be given numerical designations with an "a" suffix, even though these are not mentioned in the text.

The construction of the carrier section 102a is the same as (or substantially the same as) the carrier section 102 of the first embodiment, except that the carrier section 102a is fixedly attached to the forward roller support section 104a, instead of being removably attached as in the first embodiment.

With reference to FIG. 15, there is the forward support roller section 104a having a roller portion 144a which is the same as in the first embodiment, and an intermediate portion 148a which connects to the roller portion 144a in the same manner as in the first embodiment. The intermediate portion 148a comprises an elongate vertical portion 184a having a lower right angle bend 188a and a second right angle bend 198a.

There is a vertically aligned cylindrical connecting portion 264a which extends downwardly from the right angle bend 198a, and this fits rotatably into a matching sleeve 266a that is fixedly attached to the forward end connecting plate portion 114a of the carrier section 102a.

The connecting portion 264a is retained in the sleeve 266a by means of an upper washer 268a that is welded to the member 264a, and a lower collar 270a which is fixedly connected by a retaining screw or rivet at 272a to the lower end of the connecting portion 264a.

In operation, the transport unit 100 is positioned so that the forward and rear roller support sections 104a and 106a are mounted to the rail 101a, and the garments 138 with the hangers 137 are hung on the carrier units 122a, as in the first embodiment, and covered with a garment bag and given the identification tag.

Then, the carrier unit 100a is moved to the out-bound region 16 over the rail system 24. At the out-bound region 16, the forward roller support section 104a is lifted upwardly to disengage its roller portion 144a from the rail 101a, and the carrier section 102a along with the forward roller support section 104a is moved about the pivot connection 238a downwardly to the vertical orientation as shown in FIG. 16. Then, the entire transport unit 100a is moved over the connecting rail portion and onto the rail inside the truck or semi-trailer 18. When the truck 18 reaches the retail store or other end location 17, the transport unit 100a, still in its vertical orientation, is moved out of the truck and onto the rail system in the retail store or other end location 17. If it is desired to move the transfer 100a unit back to its horizontal position, then the forward end of the carrier section 102a is moved upwardly and the forward roller support section 104a is again mounted onto the rail.

Normally, the garments would be removed from the carrier section 102a in a short time after delivery to the retail store, and the transport unit 100a can then be placed at a pickup location at the retail store 17. Then, on the following day or at least at the time of the following trip of the truck 18 to the retail store 17, the truck 18 can pick up the transport units that had previously been delivered on the prior trip.

It is obvious that various modifications could be made to the present invention without departing from the basic teachings thereof.

What is claimed is:

1. A transport unit adapted to transport a plurality of apparel units over a rail/conveying system, with said apparel units being able to be positioned in a first position in a substantially horizontal alignment relative to one another and also supported in a second position to be substantially vertically aligned relative to one another, where said system comprises a rail subsystem which comprises at least one rail having a first rail location and a second rail location, and a conveying subsystem extending over at least a portion of said rail subsystem, with said conveying subsystem comprising a plurality of driven conveying elements located at spaced locations and arranged to be moved along a conveying path of said rail, said transport unit comprising:

a) a carrier section having a longitudinal axis, a transverse axis, a vertical axis, first and second carrier end portions, longitudinally spaced, and having first and second carrier end connecting portions, respectively, said carrier section having a plurality of longitudinally spaced apparel unit support regions arranged to engage and support said apparel units;

b) first and second roller support sections which have first and second lower roller carrier connecting portions, respectively, arranged to be connected to said first and second carrier end connecting portions of the carrier section, respectively, said first and second roller support sections having first and second upper roller portions, respectively, to engage said rail;

c) said second roller support section being rotatably connected to the second carrier end connecting portion for rotation about a generally transverse axis about which the carrier section is able to rotate from a substantially horizontal first operating position to a substantially vertical second operating position, with said second roller support section remaining in engagement with the rail section and with the first roller support section being at a substantially fixed angular position relative to possible angular movement of the first upper roller portion about said transverse axis whereby said transport unit can be positioned in a first operating position in which said carrier section is generally horizontally aligned and connected to both roller support sections which are in engagement with said rail and supporting said apparel units in a first support position in general horizontal alignment with one another so that said transport unit can be engaged by a conveying element to be moved along a rail, and a transport unit first end portion can be disengaged from load bearing engagement with the rail and at least the first end portion of the carrier section can be lowered to said second operating position where the carrier section is in a substantially vertically oriented position and supported primarily by the second roller support section to place the apparel units in a second support position so as to be in substantially vertical alignment, after which the transport unit in a second operating position and with said apparel units in a second support position can be moved or stored in the second position.

2. The transport unit as recited in claim 1, wherein said first transport unit end portion is removably connected to said first roller support section so that the first transport unit end portion can be disengaged from load bearing engagement with the rail by disengaging said carrier section from said first roller support section.

3. The transport unit as recited in claim 1, wherein said first roller support section is fixedly connected to the first carrier end connecting portion so that said first transport unit end portion can be disengaged from load bearing engagement with the rail by disengaging the first roller support section from the rail, with said first roller support section remaining connected to the carrier section.

4. The transport unit as recited in claim 1, wherein the upper roller portion of said first and second roller support section each have first and second end surface portions that are spaced from one another by an upper end surface roller length dimension, and the carrier section has first and second end surface portions that are spaced from one another by a carrier length dimension, said roller length dimension being no greater than about one half of said carrier length dimension.

5. The transport unit as recited in claim 4, wherein said upper roller end surface length dimension is no greater than about one third of the carrier length dimension.

6. The transport unit as recited in claim 4, wherein said upper roller end surface length dimension is no great than one fifth of the carrier length dimension.

7. The transport unit as recited in claim 4, wherein said upper roller end surface length dimension is no greater than about one seventh of the carrier length dimension.

8. The transport as recited in claim 4, wherein said upper roller end surface length dimension is no greater than one tenth of the carrier length dimension.

9. The transport unit as recited in claim 1, wherein the upper roller portion of said first and second roller support section each have first and second rollers that have axes of rotation that are spaced from one another by a roller center axis spacing dimension, and the carrier section has first and second end surface portions that are spaced from one another by a carrier length dimension, said roller center axis spacing dimension being no greater than about one third of said carrier length dimension.

10. The transport unit as recited in claim 9, wherein said roller center axis spacing dimension is no greater than about one fifth of the carrier length dimension.

11. The transport unit as recited in claim 9, wherein said roller center axis spacing dimension is no greater than one seventh of the carrier length dimension.

12. The transport unit as recited in claim 9, wherein center axis spacing dimension is no greater than about one tenth of the carrier length dimension.

13. The transport unit as recited in claim 9, wherein said roller center axis spacing dimension is no greater than about one fifteenth of the carrier length dimension.

14. The transport unit as recited in claim 1, wherein one of said first roller carrier connecting portion and said first carrier end connecting portion comprises a generally vertically aligned connecting member and the other of said first lower roller carrier connecting portion and said first carrier end connecting portion comprises a recessed connecting member having a generally vertically aligned recess, whereby said first lower roller connecting portion and said first carrier end connecting portion can be positioned in vertical alignment with one another and moved vertically with respect to one another to make a connection or a disconnection.

15. The transport unit as recited in claim 14, wherein said first lower roller connecting portion and said first carrier end portion are arranged so that in a connecting position, relative rotation of the first roller support section about a transverse axis of rotation relative to said carrier section is restrained.

16. The transport unit as recited in claim 15, wherein said first lower roller connecting portion and said first carrier end portion are arranged so that in an engaged position, at least limited relative rotation about a vertical axis of rotation is permitted.

17. The transport unit as recited in claim 1, wherein at least one of said roller support sections comprises a counterbalance portion which is spaced laterally from said transport unit so that the transport unit when suspended from a rail has the carrier section substantially in vertical alignment with the first and second upper roller sections.

18. The transport unit as recited in claim 1, wherein said second roller support section comprises an intermediate second connecting portion which has a rotatable connection permitting rotational movement about a rear generally vertical axis of rotation between the second lower roller carrier connecting portion and the second upper roller portion.

19. The transport unit as recited in claim 1, wherein said second roller support section has a rotatable connection permitting rotational movement about a second generally vertical second axis of rotation between the second lower roller carrier connecting portion and the second upper roller portion and said first upper roller section is connected to said first carrier end portion to permit relative rotation between said first roller support section and said carrier section about a generally vertically aligned first axis of rotation.

20. The transport unit, as recited in claim 13, wherein said first roller support section is connected to said first carrier end connecting portion to restrain relative rotational movement of said first roller support section and said carrier section about a first generally transversely aligned axis of rotation.

21. The transport unit, as recited in claim 1, wherein said first carrier end connecting portion connects to said first lower roller carrier connecting portion so as to restrain relative rotational movement of said first carrier end portion and said first roller support section about a first transversely aligned axis.

22. The transport unit, as recited in claim 1, wherein said second roller support section comprises a stop device to limit rotation of said second roller support section from an upwardly extending position when the transport unit is generally horizontally aligned, so that the second roller support section is able to rotate downwardly beyond the longitudinal axis, but is not able to rotate further downwardly to a generally downwardly extending position at a right angle to the longitudinal axis, whereby when the transport unit is being handled, the second roller support section is limited in dropping downwardly to a lower location to cause injury to a person holding the transport unit at a location proximate to the second end portion of the transport unit.

23. The transport unit, as recited in claim 22, wherein said second roller support section is not able to rotate beyond an angle which is no greater than about three quarters of a right angle downwardly from the longitudinal axis.

24. The transport unit, as recited in claim 22, wherein said second roller support section is not able to rotate beyond an angle which is no greater than about one half of a right angle downwardly from the longitudinal axis.

25. The transport unit, as recited in claim 22, wherein the second carrier end connecting portion comprises a pair of vertically and longitudinally oriented support members spaced laterally from one another to define a vertically and longitudinally aligned mounting space, and at least a portion of the second lower roller carrier connecting portion is located in said mounting space where it is able to rotate about a transverse axis.

26. The transport unit, as recited in claim 1, wherein said carrier section comprises a central apparel carrying portion, which in turn comprises a structural apparel support portion and an apparel unit engaging portion, with said apparel unit engaging portion comprising a plurality of carrier units at longitudinally spaced locations each of which carrier units comprises a lower cross member and upwardly extending and oppositely positioned side fingers which collectively define an open area of a related one of said support regions.

27. The transport unit, as recited in claim 26, wherein said structural apparel support portion comprises a plurality of longitudinally extending rods, and said side fingers are connected to at least two of said rods, thus providing structural support in said structural apparel support portion.

28. The transport unit, as recited in claim 26, where there are at least two rods vertically spaced from one another so as to occupy a vertical plane, and the side fingers of each carrier unit are rigidly connected to said at least two rods to provide a structural support.

\* \* \* \* \*